(12) United States Patent
Mannlein et al.

(10) Patent No.: US 7,117,066 B2
(45) Date of Patent: Oct. 3, 2006

(54) COMPUTER CONTROLLED CUP FORMING MACHINE

(75) Inventors: Dean Joseph Mannlein, Forest Hill, MD (US); Thomas David Pyper, Jr., Easton, MD (US)

(73) Assignee: Solo Cup Operating Corporation, Highland Park, IL (US)

( * ) Notice: Subject to any disclaimer, the term of this patent is extended or adjusted under 35 U.S.C. 154(b) by 0 days.

(21) Appl. No.: 10/979,744

(22) Filed: Nov. 2, 2004

(65) Prior Publication Data
US 2006/0095151 A1   May 4, 2006

(51) Int. Cl.
*G06F 19/00* (2006.01)

(52) U.S. Cl. .................. 700/170; 700/159; 700/180; 700/193

(58) Field of Classification Search .............. 700/159, 700/170, 180, 193
See application file for complete search history.

(56) References Cited

U.S. PATENT DOCUMENTS

| | | | |
|---|---|---|---|
| 1,771,765 A | 7/1930 | Benson |
| 2,028,566 A | 1/1936 | Seipel et al. |
| 2,374,339 A | 4/1945 | Emerson |
| 2,540,565 A | 2/1951 | Barbieri |
| 2,563,352 A | 8/1951 | Morse |
| 2,661,889 A | 12/1953 | Phinney |
| 2,675,954 A | 4/1954 | Vogel |
| 2,828,903 A | 4/1958 | Adkins |
| 2,853,222 A | 9/1958 | Gallagher |
| 3,001,683 A | 9/1961 | Goodwin et al. |
| 3,049,277 A | 8/1962 | Shappell |
| 3,082,900 A | 3/1963 | Goodman |
| 3,126,139 A | 3/1964 | Schecter |
| RE25,618 E | 7/1964 | Goodman |
| 3,199,757 A | 8/1965 | McConnell |
| 3,237,834 A | 3/1966 | Davis et al. |
| 3,317,110 A | 5/1967 | Palmer |
| 3,410,473 A | 11/1968 | Petrie |
| 3,443,715 A | 5/1969 | Edwards |
| 3,456,860 A | 7/1969 | Jannick |
| 3,495,736 A | 2/1970 | Ragettli |
| 3,580,468 A | 5/1971 | McDevitt |
| 3,759,437 A | 9/1973 | Amberg |
| 3,908,523 A | 9/1975 | Shikaya |
| 3,919,368 A | 11/1975 | Seto |

(Continued)

FOREIGN PATENT DOCUMENTS

CA          2021036        1/1991

(Continued)

OTHER PUBLICATIONS

"A Comprehensive Guide To Industrial Networks"-Webpage printed from sensorsmag.com, verified through the "Wayback Machine" to be unchanged since Nov. 2001.*

(Continued)

*Primary Examiner*—Leo Picard
*Assistant Examiner*—Michael D. Masinick
(74) *Attorney, Agent, or Firm*—Wallenstein & Wagner, Ltd.

(57) ABSTRACT

A computer controlled cup forming machine is provided. The computer controlled cup forming machine has a main motor, a main controller, and a plurality of workstations having individual motors electrically connected to the main motor and the main controller. The main controller develops electrical signals of a drive or motion profile that are sent to the individual motors, and the main motor sends additional electrical signals to the individual motors to initiate the drive profiles at the individual motors. The main controller also has an input station to quantitatively control each of the individual motors.

31 Claims, 24 Drawing Sheets

U.S. PATENT DOCUMENTS

| | | |
|---|---|---|
| 3,988,521 A | 10/1976 | Fumel et al. |
| 4,093,904 A | 6/1978 | Burig et al. |
| 4,168,676 A | 9/1979 | Itoh |
| 4,211,339 A | 7/1980 | Itoh |
| 4,261,501 A | 4/1981 | Watkins et al. |
| 4,264,657 A | 4/1981 | Tollehe |
| 4,435,344 A | 3/1984 | Iioka |
| 4,550,854 A | 11/1985 | Schellenberg |
| 4,836,764 A | 6/1989 | Parkinson |
| 4,878,970 A | 11/1989 | Schubert et al. |
| 4,993,580 A | 2/1991 | Smith |
| 4,997,125 A | 3/1991 | Glerum |
| 4,997,691 A | 3/1991 | Parkinson |
| 5,025,981 A | 6/1991 | Schellenberg |
| 5,040,682 A | 8/1991 | Palisin, Jr. et al. |
| 5,091,231 A | 2/1992 | Parkinson |
| 5,092,485 A | 3/1992 | Lee |
| 5,145,047 A * | 9/1992 | Terracol et al. ........ 198/341.02 |
| 5,145,107 A | 9/1992 | Silver et al. |
| 5,203,490 A | 4/1993 | Roe |
| 5,203,492 A | 4/1993 | Schellenberg |
| 5,205,473 A | 4/1993 | Coffin, Sr. |
| 5,226,585 A | 7/1993 | Varano |
| 5,267,685 A | 12/1993 | Sorensen |
| 5,324,249 A | 6/1994 | Konzal |
| 5,333,749 A | 8/1994 | Schellenberg |
| 5,363,982 A | 11/1994 | Sadlier |
| 5,385,260 A | 1/1995 | Gatcomb |
| 5,415,339 A | 5/1995 | Howard |
| 5,425,497 A | 6/1995 | Sorensen |
| 5,460,323 A | 10/1995 | Titus |
| 5,469,983 A | 11/1995 | Yawata |
| 5,490,631 A | 2/1996 | Iioka et al. |
| 5,524,817 A | 6/1996 | Meier et al. |
| 5,542,599 A | 8/1996 | Sobol |
| 5,547,124 A | 8/1996 | Mueller |
| 5,628,453 A | 5/1997 | MacLaughlin |
| 5,660,326 A | 8/1997 | Varano et al. |
| 5,667,135 A | 9/1997 | Schaefer |
| 5,669,553 A | 9/1997 | Smith |
| 5,685,480 A | 11/1997 | Choi |
| 5,697,550 A | 12/1997 | Varano et al. |
| 5,713,512 A | 2/1998 | Barrett |
| 5,725,916 A | 3/1998 | Ishii et al. |
| 5,746,372 A | 5/1998 | Spence |
| 5,749,514 A | 5/1998 | Brown et al. |
| 5,752,646 A | 5/1998 | Sandstrom |
| 5,752,653 A | 5/1998 | Razzaghi |
| RE35,830 E | 6/1998 | Sadlier |
| 5,759,624 A | 6/1998 | Neale et al. |
| 5,765,716 A | 6/1998 | Cai et al. |
| 5,766,709 A | 6/1998 | Geddes et al. |
| 5,769,311 A | 6/1998 | Morita et al. |
| 5,772,111 A | 6/1998 | Kirsch |
| 5,775,577 A | 7/1998 | Titus |
| 5,794,843 A | 8/1998 | Sanchez |
| 5,820,016 A | 10/1998 | Stropkay |
| 5,826,786 A | 10/1998 | Dickert |
| 5,839,653 A | 11/1998 | Zadravetz |
| 5,840,139 A | 11/1998 | Geddes et al. |
| 5,857,615 A | 1/1999 | Rose |
| 5,911,360 A | 6/1999 | Schellenberg |
| 5,950,917 A | 9/1999 | Smith |
| 5,952,068 A | 9/1999 | Neale et al. |
| 5,964,400 A | 10/1999 | Varano et al. |
| 5,992,489 A * | 11/1999 | Busse .................... 156/443 |
| 6,010,062 A | 1/2000 | Shimono |
| 6,030,476 A | 2/2000 | Geddes et al. |
| 6,038,915 A | 3/2000 | O'Hearon et al. |
| 6,039,682 A | 3/2000 | Dees et al. |
| 6,047,852 A | 4/2000 | Evans et al. |
| 6,053,352 A | 4/2000 | Cai |
| 6,059,140 A | 5/2000 | Hicks |
| 6,068,182 A | 5/2000 | Tokunaga |
| 6,070,755 A | 6/2000 | Evans et al. |
| 6,085,970 A | 7/2000 | Sadlier |
| 6,093,462 A | 7/2000 | O'Herron et al. |
| 6,109,518 A | 8/2000 | Mueller et al. |
| 6,116,503 A | 9/2000 | Varano |
| 6,126,584 A | 10/2000 | Zadravetz |
| 6,129,653 A | 10/2000 | Fredricks et al. |
| 6,139,665 A | 10/2000 | Schmelzer et al. |
| 6,142,331 A | 11/2000 | Breining et al. |
| 6,152,363 A | 11/2000 | Rille, Jr. |
| 6,182,855 B1 | 2/2001 | Alpert |
| 6,186,394 B1 | 2/2001 | Dees et al. |
| 6,193,098 B1 | 2/2001 | Mochizuki et al. |
| 6,196,454 B1 | 3/2001 | Sadlier |
| 6,224,954 B1 | 5/2001 | Mitchell et al. |
| 6,250,545 B1 | 6/2001 | Mazzarolo et al. |
| 6,253,995 B1 | 7/2001 | Blok et al. |
| 6,257,485 B1 | 7/2001 | Sadlier et al. |
| 6,260,756 B1 | 7/2001 | Mochizuki et al. |
| 6,264,068 B1 | 7/2001 | Ours et al. |
| 6,267,837 B1 | 7/2001 | Mitchell et al. |
| 6,277,454 B1 | 8/2001 | Neale et al. |
| 6,286,709 B1 | 9/2001 | Hudson |
| 6,286,754 B1 | 9/2001 | Stier et al. |
| 6,286,798 B1 | 9/2001 | Chun |
| 6,287,247 B1 | 9/2001 | Dees et al. |
| 6,290,091 B1 | 9/2001 | Bell |
| 6,308,883 B1 | 10/2001 | Schmelzer et al. |
| 6,311,457 B1 | 11/2001 | May et al. |
| 6,315,192 B1 | 11/2001 | Marlow |
| 6,319,590 B1 | 11/2001 | Geddes et al. |
| 6,343,496 B1 * | 2/2002 | Hanna et al. .................. 72/61 |
| 6,343,735 B1 | 2/2002 | Cai |
| 6,364,149 B1 | 4/2002 | Smith |
| 6,364,201 B1 | 4/2002 | Varano |
| 6,378,766 B1 | 4/2002 | Sadlier |
| 6,412,686 B1 | 7/2002 | Mahl et al. |
| 6,416,453 B1 | 7/2002 | Simonetti et al. |
| 6,416,829 B1 | 7/2002 | Breining et al. |
| 6,422,456 B1 | 7/2002 | Sadlier |
| 6,464,100 B1 | 10/2002 | Canfield |
| 6,482,481 B1 | 11/2002 | Fredricks et al. |
| 6,528,105 B1 | 3/2003 | Gerhart et al. |
| 6,536,657 B1 | 3/2003 | VanHandel |
| 6,557,751 B1 | 5/2003 | Puerini |
| 6,565,934 B1 | 5/2003 | Fredricks et al. |
| 6,586,075 B1 | 7/2003 | Mitchell et al. |
| 6,598,786 B1 | 7/2003 | Guo |
| 6,601,728 B1 | 8/2003 | Newkirk et al. |
| 6,610,339 B1 | 8/2003 | Borgerson |
| 6,641,854 B1 | 11/2003 | Gerhart et al. |
| 6,663,926 B1 | 12/2003 | Okushita et al. |
| 6,663,927 B1 | 12/2003 | Breining et al. |
| D485,133 S | 1/2004 | Breeze-Stringfellow |
| 6,676,586 B1 | 1/2004 | Breining et al. |
| 6,703,090 B1 | 3/2004 | Breining et al. |
| 2001/0013537 A1 | 8/2001 | Sadlier |
| 2001/0027979 A1 | 10/2001 | Canfield |
| 2001/0038893 A1 | 11/2001 | Mohan et al. |
| 2001/0050287 A1 | 12/2001 | Namba et al. |
| 2002/0010991 A1 * | 1/2002 | Muscarella et al. ......... 29/38 B |
| 2002/0030296 A1 | 3/2002 | Geddes et al. |
| 2002/0125262 A1 | 9/2002 | Canfield |
| 2002/0148832 A1 | 10/2002 | Breining et al. |
| 2002/0172818 A1 | 11/2002 | DeBraal et al. |
| 2002/0183889 A1 * | 12/2002 | Sakakibara ................ 700/180 |
| 2002/0185496 A1 | 12/2002 | Puerini |
| 2003/0015582 A1 | 1/2003 | Handel |
| 2003/0029876 A1 | 2/2003 | Giraud |
| 2003/0054078 A1 | 3/2003 | Gerhart et al. |

| | | | | | | |
|---|---|---|---|---|---|---|
| 2003/0104195 | A1 | 6/2003 | Geddes et al. | DE | 3 318 704 C2 | 11/2002 |
| 2003/0111475 | A1 | 6/2003 | Cheng | GB | 2 108 922 A | 5/1983 |
| 2003/0121963 | A1 | 7/2003 | Van Handel | GB | 2 333 087 A | 7/1999 |
| 2003/0146224 | A1 | 8/2003 | Fujii et al. | WO | WO 02/05691 A2 | 1/2002 |
| 2003/0157224 | A1 | 8/2003 | Westerhof et al. | | | |
| 2003/0209556 | A1 | 11/2003 | Gruber | | | |
| 2003/0226882 | A1 | 12/2003 | Porchia et al. | | | |
| 2004/0011801 | A1 | 1/2004 | Rodriguez | | | |
| 2004/0037980 | A1 | 2/2004 | DeBraal | | | |

FOREIGN PATENT DOCUMENTS

DE    100 54 727 A1    8/2002

OTHER PUBLICATIONS

U.S. Appl. No. 10/676,807, filed Oct. 2003, Smith.

* cited by examiner

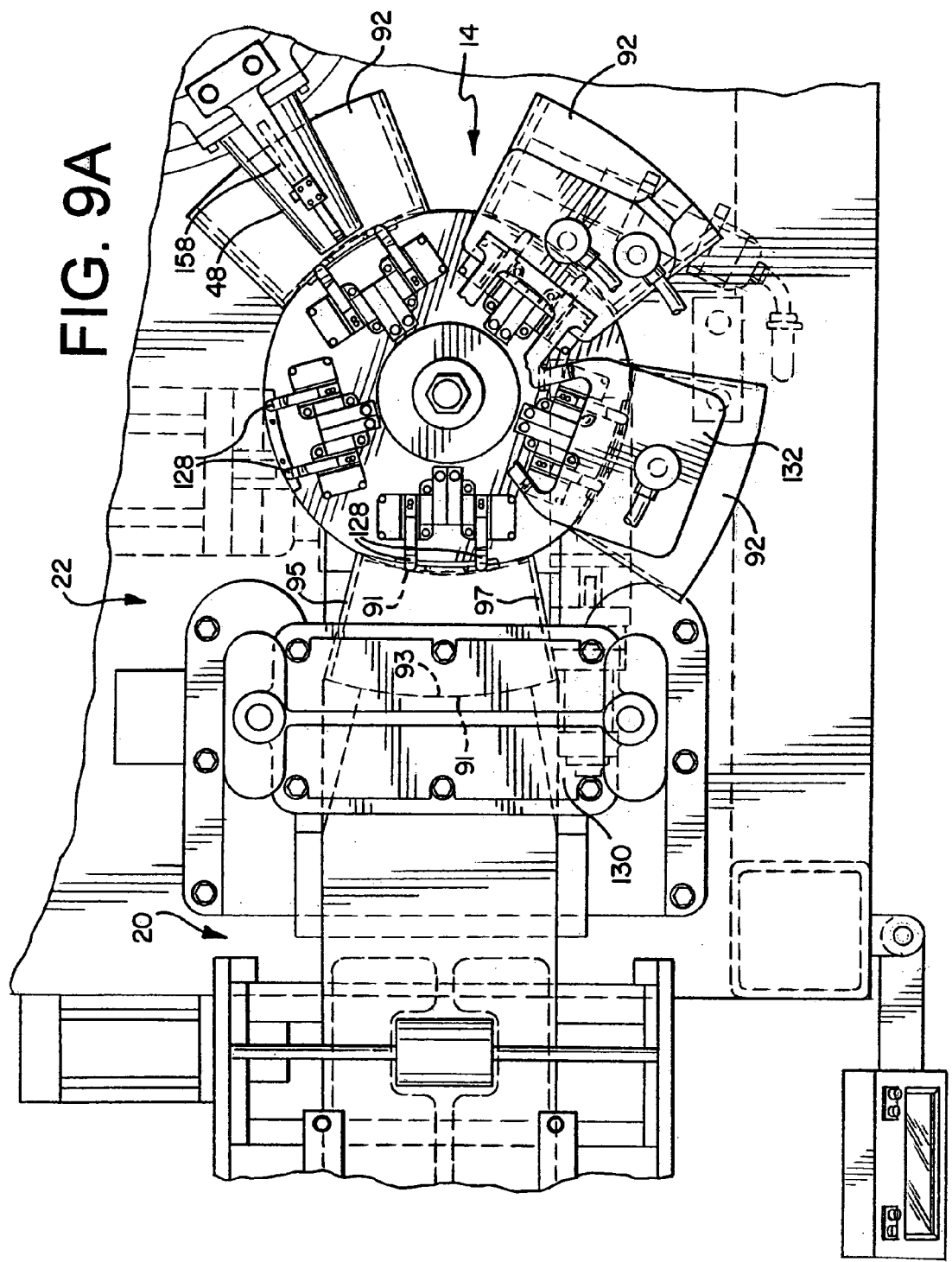

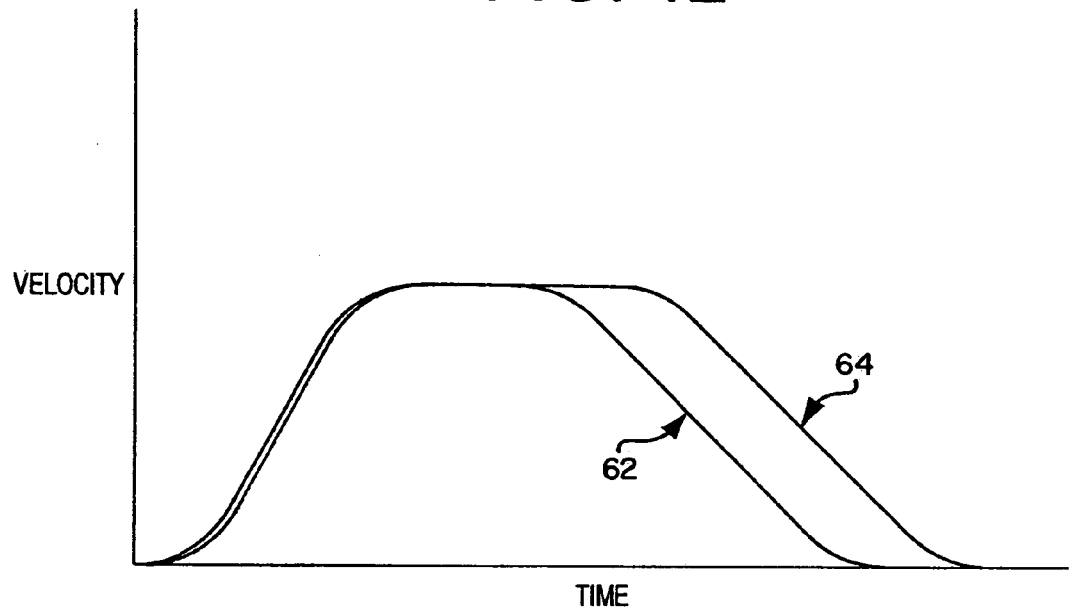
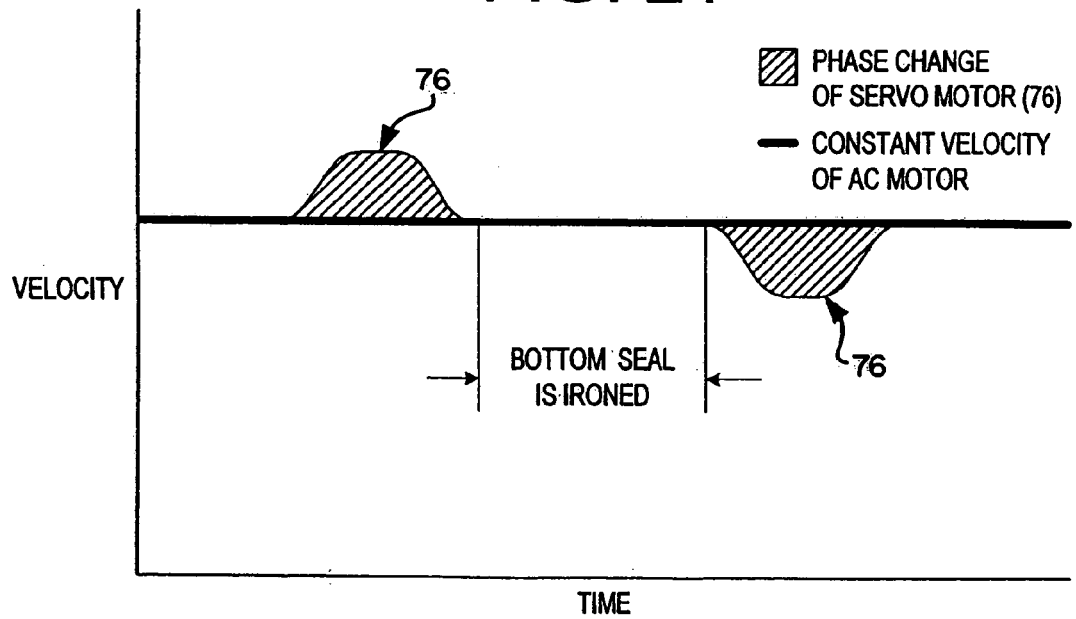

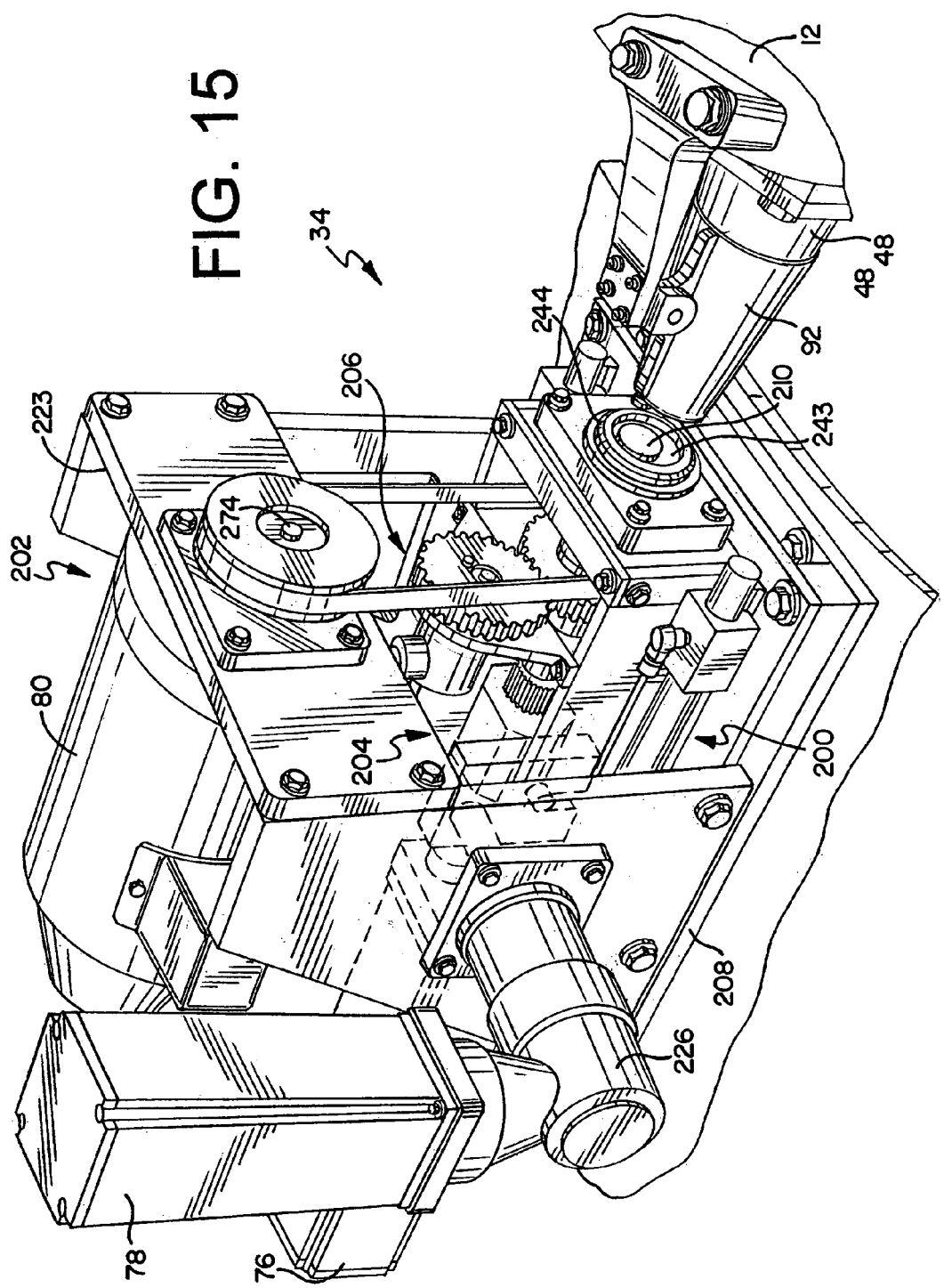

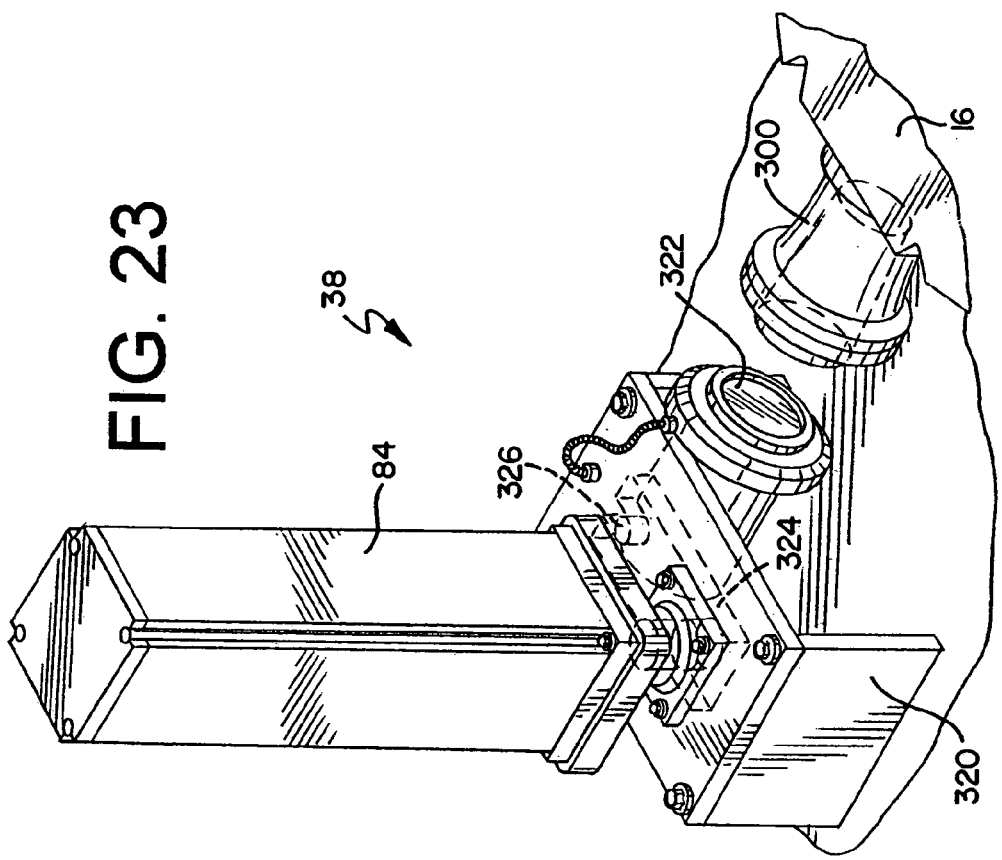
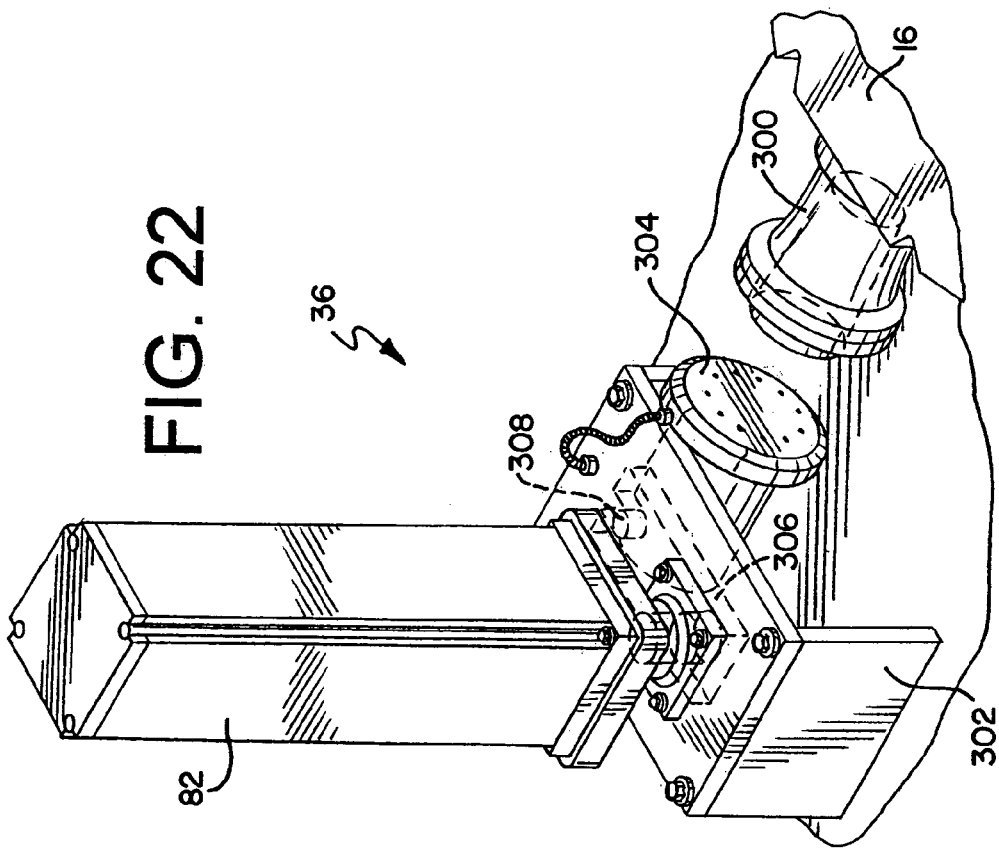

COMPUTER CONTROLLED CUP FORMING MACHINE

CROSS-REFERENCE TO RELATED APPLICATIONS

Not Applicable.

FEDERALLY SPONSORED RESEARCH OR DEVELOPMENT

Not Applicable.

TECHNICAL FIELD

The present invention relates generally to a machine for forming drinking cups, and more specifically to a computer controlled multi-axis paper cup forming machine.

BACKGROUND OF THE INVENTION

Cup forming machines are well known in the art. Such machines are generally used to convert a substrate into a formed cup having a sidewall and a bottom. While such cup forming machines according to the prior art provide a number of advantageous features, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention generally provides a computer controlled cup forming machine. In one embodiment the cup forming machine has a main motor driving a main turret assembly, and a plurality of workstations spaced about the periphery of the main turret assembly. The main motor is electrically connected to at least one of the plurality of workstations spaced about the periphery of the main turret assembly, and the main motor develops electrical signals of the position of the main motor and sends the electrical signals to the workstations electronically connected thereto to initiate action of the workstations.

According to another embodiment, a plurality of the workstations have separate drive motors that are electrically connected to the main motor.

According to another embodiment, a computer controlled cup forming machine having workstations performing functions on paper materials to create a paper cup is provided. The machine has individual motors for a plurality of the workstations, and a main controller electrically connected to the individual motors. The main controller stores drive profiles for the individual motors, and sends signals of the drive profiles to the individual motors. In one embodiment, the main controller sends the signals to the drives of the individual motors.

According to another embodiment, an input station is electrically connected to the main controller. At the input station an operator can quantitatively adjust control parameters for the motors. The main controller sends signals to the motors of the adjusted control parameters to assist in quantitatively controlling the motion of the motors. In one embodiment a dwell period for the drive profiles for the motors can be adjusted at the input station and set independent of the machine speed of the cup forming machine.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 9A is a top plan view of the transfer turret assembly;

FIG. 12 is a motion profile for a folding wing workstation;

FIG. 15 is a perspective view of the second bottom forming workstation;

FIG. 21 is a motion profile for the second bottom forming workstation;

FIG. 22 is a perspective view of the tamper and lube workstation;

FIG. 23 is a perspective view of one of the curl stations;

DETAILED DESCRIPTION

Figure 1:
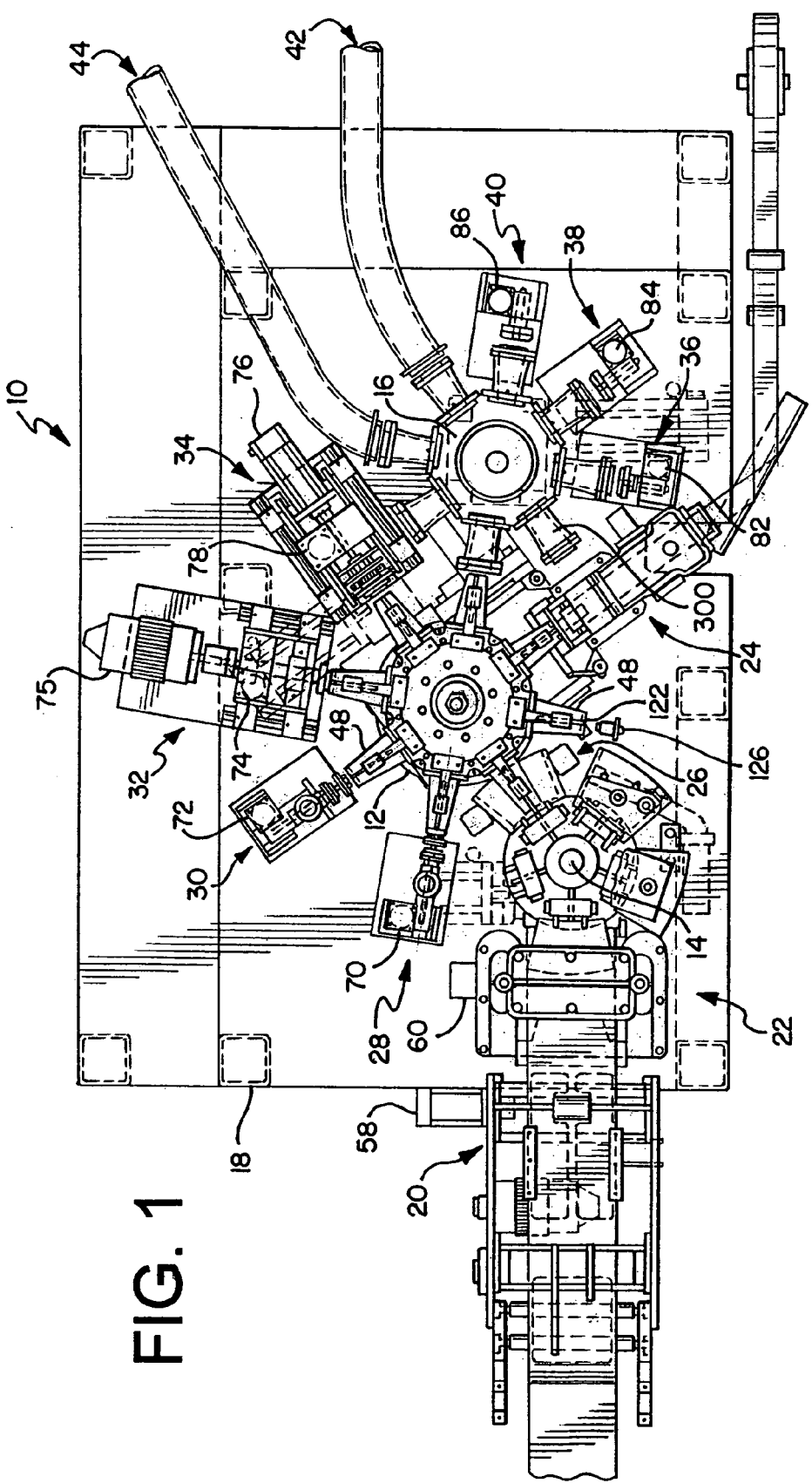
FIG. 1 is a top view of one embodiment of a cup forming machine.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
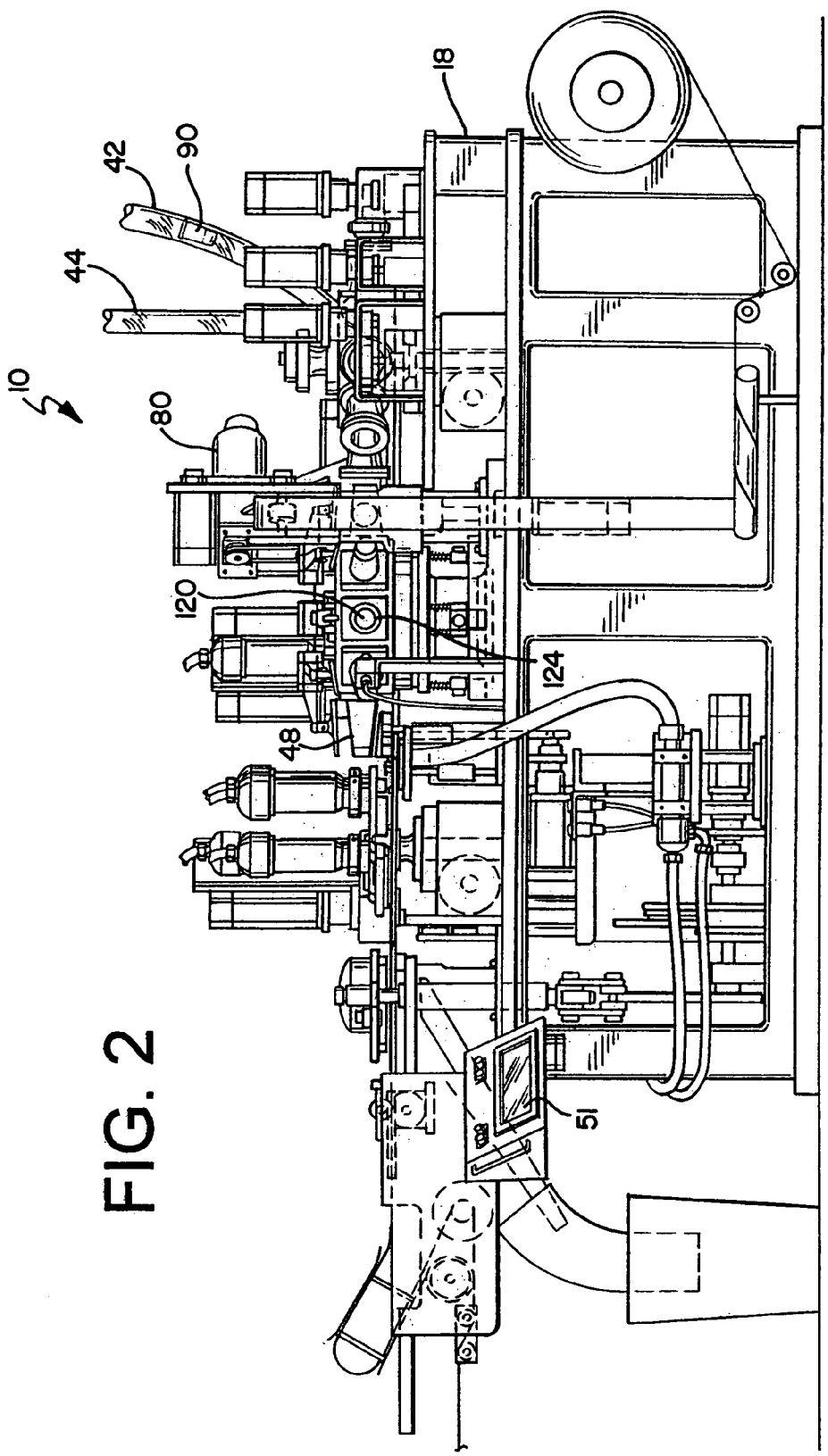
FIG. 2 is a front elevation view of the cup forming machine of FIG. 1.
Figure 3:
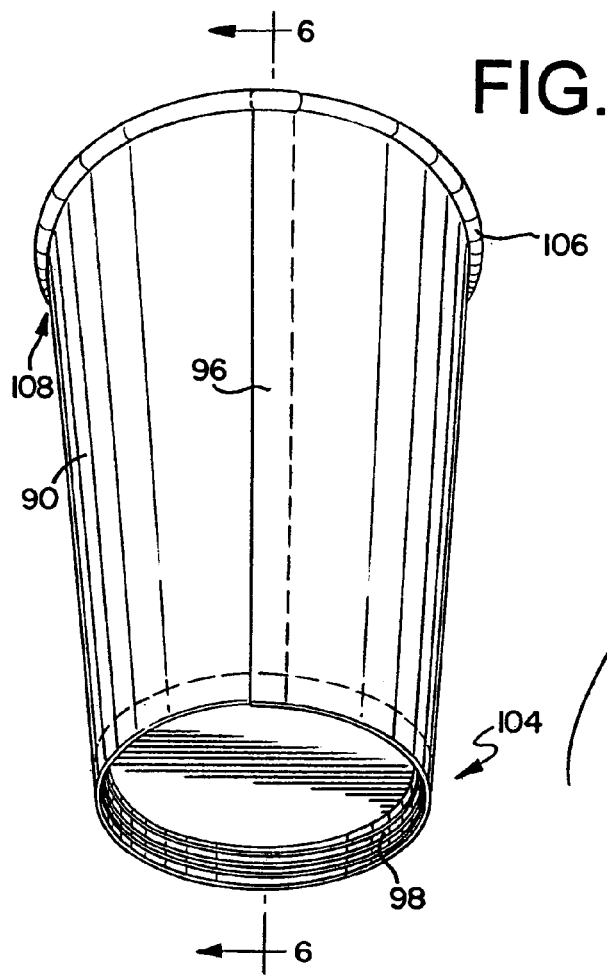
FIG. 3 is a perspective view of a cup manufactured on the cup forming machine of FIG. 1.
Figure 5:
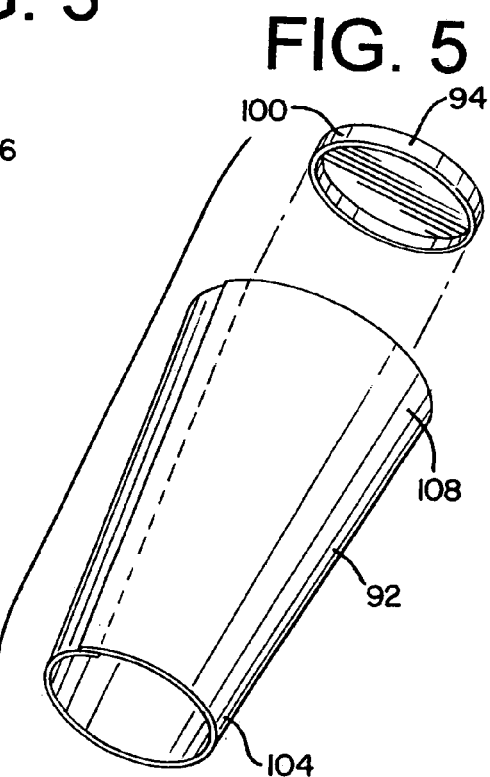
FIG. 5 is an exploded view of the paper cup of FIG. 3.
Figure 4:
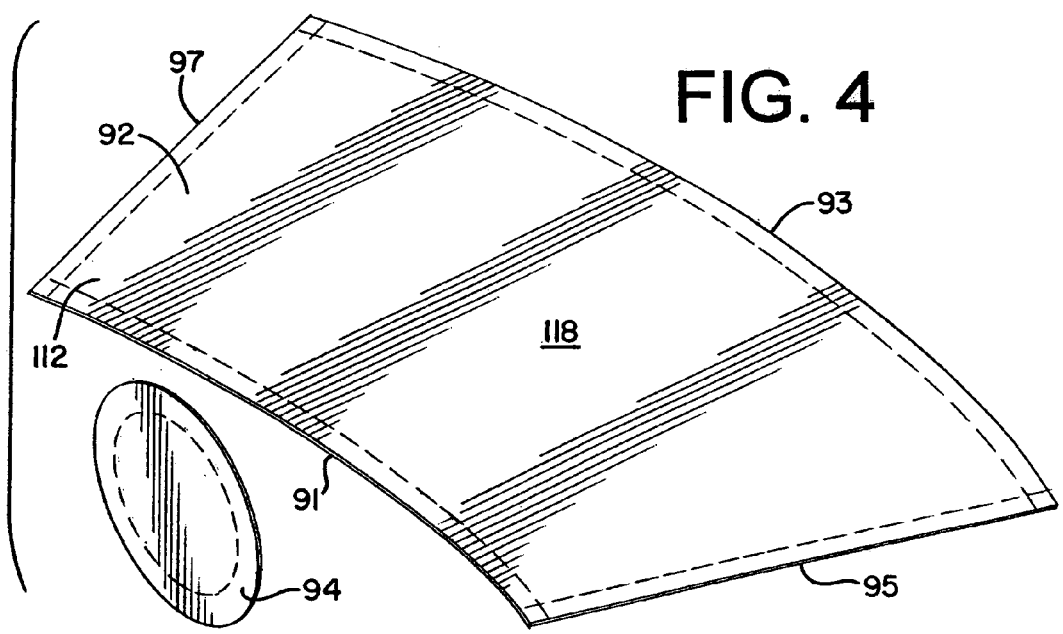
FIG. 4 is a top plan view of the sidewall blank and bottom wall blank of the paper cup of FIG. 3.

Referring now to the Figures, and specifically to FIGS. 1 and 2, there is shown a cup forming machine 10. The cup forming machine 10 in the present example generally comprises a main or mandrel turret 12, a transfer turret 14, and a rimming turret 16 mounted on a frame 18, however, the cup forming machine may be comprised of a variety of turrets and workstations in a variety of configurations. In the exemplar embodiment, each of the turrets 14, 16, 18 are horizontal-type turrets.

Turning again to FIGS. 1 and 2, a plurality of workstations surround the mandrel turret 12, transfer turret 14 and rimming turret 16. Specifically, in this example some of the workstations include, but are not limited to: a sidewall feeder workstation 20, a sidewall die cutter workstation 22, a bottom punch workstation 24, a folding wing workstation 26, a first bottom heater workstation 28, a second bottom heater workstation 30, a first bottom forming workstation 32, a second bottom forming workstation 34, a tamper and lube workstation 36, a pre-curl workstation 38, a finish curl workstation 40, a production discharge workstation 42 and a reject discharge workstation 44. Each of the workstations is typically mounted to the frame 18 of the cup forming machine 10. During continuous operation of the cup forming machine 10, each partially formed cup 46 generally engages each workstation once. Hence, one finished cup 90 is produced per each cycle of the cup forming machine 10. It is understood that while a cup forming machine having a particular configuration with various workstations is described herein for purpose of example, one of ordinary skill in the art would readily understand that the teachings herein have broad applicability and apply to numerous other types of cup forming machines and configurations thereof.

In a conventional cup forming machine, a single main drive motor connected to a single main drive shaft rotating at a constant angular velocity is utilized to provide the drive for each of the turrets and workstations. Typically, one drive shaft revolution constitutes one machine cycle, during which each workstation performs a particular task on the cup or component thereof associated with a particular mandrel. To ensure that each workstation engages and performs its task on each cup at the appropriate time, the myriad of mechanical apparatuses and the turrets with which they cooperate are driven by the single main drive shaft. Having a single main drive shaft, however, detrimentally affects the machine performance and capabilities. For example, horsepower is transmitted from the drive shaft at various points along its length by belts, pulleys, chains, gears, cams, etc. which in turn supply power to each of the turrets and workstations. As many of the mechanisms of the turrets and workstations move, they extract horsepower from the main drive shaft during some portion of each machine cycle. Further, in order to modify the drive characteristics of each turret and workstation, various components must be changed and/or re-machined. Additionally, accelerations of mechanisms on the conventional cup forming machine are slower, thereby allowing a lesser amount of dwell time for each mechanism to perform its function.

Figure 8:
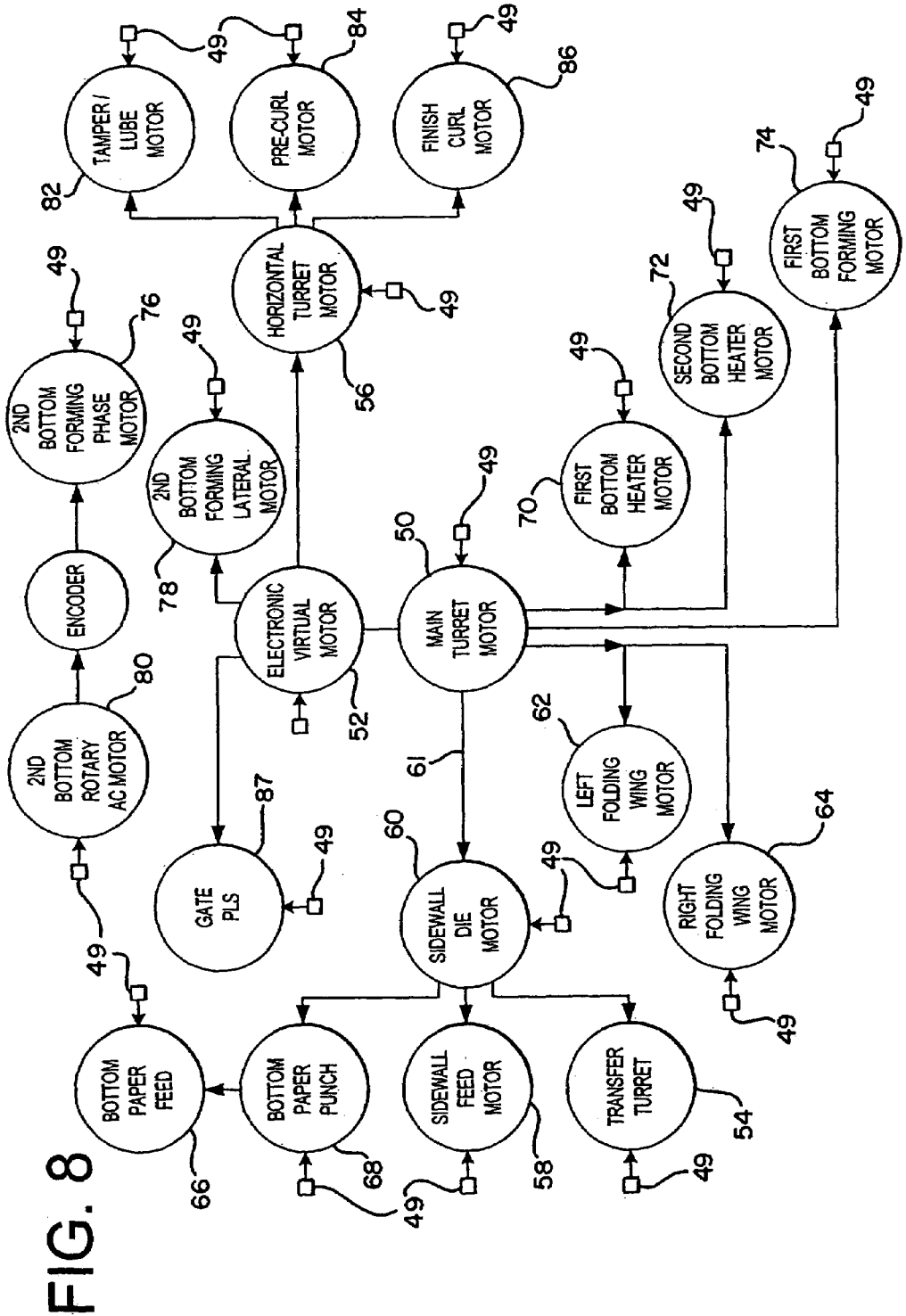
FIG. 8 is a schematic drive layout of one embodiment of the paper cup forming machine.

Conversely, in a preferred embodiment of the present invention, a plurality of drives motors are utilized to drive the different turrets and workstations. The drive motors receive signals from various controllers and are controlled thereby. Further, the drive parameters and profiles may be independently modified electronically and substantially in real time, and the profiles may be created to allow for increased dwell time of each workstation. In one example of the paper cup forming machine 10, approximately 18 different servo axes (17 axes with servo motors, ½ axis for the encoder for the virtual motor 52, and ½ axis for the digital encoder 296 for the second bottom forming workstation 34) and 22 different motors (21 physical motors and 1 virtual electronic motor) are provided and controlled by the main controller 49. As explained in detail herein, the main controller 49 has a memory that stores a plurality of drive or motion profiles, and the main controller 49 is electrically connected to a plurality of drives of various motors and sends signals of the drive profiles to those motors via their respective drives. Referring to FIG. 8, in this embodiment there exists:

| Motor Number | Axis Number | Motor Description | Reference Number |
|---|---|---|---|
| 1 | 1 | Main Turret Drive Motor | 50 |
| 2 |   | Virtual Motor | 52 |
| 3 | 4 | Transfer Turret Motor | 54 |
| 4 | 14 | Horizontal Turret Motor | 56 |
| 5 | 2 | Sidewall Feeder Motor | 58 |
| 6 | 3 | Sidewall Paper Die Motor | 60 |
| 7 | 5 | Left Folding Wing Motor | 62 |
| 8 | 6 | Right Folding Wing Motor | 64 |
| 9 | 7 | Bottom Paper Feed Motor | 66 |
| 10 | 8 | Bottom Paper Punch Motor | 68 |
| 11 | 9 | First Heater Motor | 70 |
| 12 | 10 | Second Heater Motor | 72 |
| 13 | 11 | First Bottom Forming Linear Motor | 74 |
| 14 |   | First Bottom Forming Rotary AC Motor | 75 |
| 15 | 13 | Second Bottom Forming Phase Adjustment Motor | 76 |
| 16 | 12 | Second Bottom Forming Linear Motor | 78 |
| 17 |   | Second Bottom Forming AC Rotary Motor | 80 |
| 18 | 15 | Tamper Lube Motor | 82 |
| 19 | 16 | Pre-Curl Motor | 84 |
| 20 | 17 | Finish Curl Motor | 86 |
| 21 |   | Sidewall Paper Loop Control AC Motor | (Not Shown) |
| 22 |   | Bottom Paper Loop Control AC Motor | (Not Shown) |

The controls and drive arrangements for each of the motors and workstations are described herein.

The paper cup forming machine 10 creates a finished paper cup 90 such as shown in FIGS. 3–7. This paper cup 90 is formed from a sidewall blank 92 wrapped around a bottom blank 94 that is disposed generally transverse thereto. The sidewall blank 92 is cut or punched from a continuous roll of paper at the sidewall die cutter workstation 22, and the bottom blank 94 is cut or punched from a continuous roll of paper at the bottom punch workstation 24. Alternatively, sidewall blanks 92 and bottom blanks 94 may be fed by blank feeders into the cup forming machine 10. In one embodiment, the sidewall blank 92 has a leading edge 91, adjacent the distal portion 112 of the blank 92, a trailing edge 93, which is rolled to form the overturned rim 106 of the cup 90, a first longitudinal edge 95 and an opposing second longitudinal edge 97.

When formed, the paper cup 90 has a overlapping longitudinal sidewall seam or seal 96 at the joint between the first and second opposing longitudinal edges 95, 97, a bottom seal 98 at the joint between the skirt 100 of the bottom blank 94 and the bent lip 102 at the lower region 104 of the sidewall blank 94, and a curled overturned rim 106 at the upper region 108 of the sidewall 92 leading into the cavity 110 of the cup 90. The longitudinal sidewall seam 96 is formed by overlapping one of the first or second longitudinal edges 95, 97 over the other edge 95, 97. The bottom seal 98 is formed by bending the distal most portion 112 of the sidewall 92 to form the bent lip 102. The bent lip 102 is folded over the skirt 100 portion of the bottom blank 94 such that the skirt 100 is squeezed between the distal portion 112 of the sidewall 92 and the bent lip 102 of the sidewall 92. As such, the bottom seal 98 is formed of three plies of paper. A recessed area 116 is created adjacent the side of the bottom blank 94 opposing the cavity 110 of the cup 90.

The typical cup 90 is made from paperboard blanks having a thermoplastic coating, such as a polyethylene, on at least one side of the blank. The thermoplastic material permits heating and sealing of adjacent components. It is understood that alternative types of coatings, including environmental friendly coatings, may be utilized with the present invention. In one embodiment of the cup 90, the sidewall blank 92 is a 185 lb. board and has a 0.75 mil. thermoplastic coating on one surface of the blank 92 (i.e., the surface which becomes the inside surface 118 of the formed cup 90). A thermoplastic coating may also be applied to the other surface of the blank 92 in different embodiments. The bottom blank 94, however, is made of a 126 lb. board and has a thermoplastic coating on both of it surfaces. One surface of the bottom blank 94 has a 0.75 mil. thermoplastic coating and the other surface of the bottom blank 94 has a 0.75 mil. thermoplastic coating. Accordingly, in the example of the bottom seal 98 described above, when the sidewall blank 92 is wrapped around the bottom blank 94, the adjacent heated thermoplastic coated surfaces of the distal portion 112 of the sidewall 92, the skirt 100 of the bottom blank 94, and the bent lip 102 of the sidewall blank 92 are pressed together at the second bottom forming workstation 34 to form a strong, leak-proof bottom seal 98. While this disclosure provides an example of a paper cup formed with paper having a thermoplastic coating, it is readily understood by one of ordinary skill in the art that the cup forming machine of the present invention can manufacture different types of cups as well, including plain paper, waxed paper, etc., and those cups utilizing adhesive seals instead of poly seals. Further, if a thermoplastic coating is utilized, it may be applied to one or both surfaces, and it may be applied in differing thicknesses. The paper types and thicknesses may vary also. Additionally, it is readily understood by one of ordinary skill in the art that the scope of the present invention is not limited to cup forming machines having the identified workstations, and instead the broad aspect of the present invention is applicable to a variety of cup forming machines and configurations thereof.

The mandrel turret 12 is positioned about a vertical axis, and is driven by the main turret drive motor 50 as explained above. The mandrel turret 12 has a plurality of mandrels 48 extending radially outward from the mandrel turret 12. The mandrels 48 are typically frusto-conically shaped, like the cup 90, and provide a surface on which the cups 90 are formed. If the cup or container 90 that is being formed has a straight wall, however, the mandrel 48 will also have a straight wall. In a preferred embodiment, the mandrel turret 12 has eight equally spaced mandrels 48, i.e., spaced approximately every 45° about the mandrel turret 12. Further, in a preferred embodiment the main turret motor 50 is a servo motor that has a servo drive component to receive command signals from the main controller 49, and send signals back to the controller 49 and to various drives for other workstations.

In a preferred embodiment, as explained above, the main turret motor 50 is a servo motor. In general, servo motors are electric motors that are designed for high dynamics. The servo motor operates with a servo drive (or amplifier) to control the motor current. The servo drive controls the current of the motor phases in order to supply the servo motor with exactly the current required for the desired torque and the desired speed. Further, the servo motor is equipped with a position sensor, such as an encoder, which provides the servo drive with position and speed feedback. As opposed to conventional AC motors which are generally operated at a constant speed (open loop control), a servo drive often operates at highly variable speeds, and often has to accelerate to the rated speed within milliseconds only to decelerate a short time later just as quickly. With servo motors the target position often must be reached exactly with an error of a few millimeters depending on the rating of the motor and drive. To accomplish this function, the servo controller typically has three control loops (torque, velocity, position) that drive the power circuit of the motor by constantly comparing a desired position with actual values to ensure that the motor keeps exactly to the desired motions even under varying load and rapid accelerations and decelerations. Generally, feedback information for the motor is derived from an encoder attached to the motor shaft of the servo motor. The encoder generates a pulse stream from which the processor can determine the distance traveled, and by calculating the pulse frequency it is possible to measure velocity. The drives firmware is programmed with a mathematical model (also referred to as an algorithm or profile). The algorithm or profile predicts the behavior of the motor in response to a given input command and output position. The drive profile also takes into account additional information like the output velocity, the rate of change of the input and the various tuning settings.

The main turret motor 50 is electrically connected to a plurality of workstations spaced about the periphery of the main turret assembly. Such electrical connection may be direct or indirect. In a preferred embodiment, the servo drive of the main turret motor 50 has three programmable limit switch outputs. These outputs allow the drive of the main turret motor 50 to send out electronic signals when pre-programmed positions are reached by the main turret motor 50. Accordingly, the main turret motor 50 develops electrical signals of the position of the main motor 50 and sends the electrical signals to the workstations electronically connected thereto to initiate action of the workstations. In a preferred embodiment as shown in FIG. 8, the three programmable limit switch output signals of the drive of the main turret motor 50 are provided to: (1) the left and right folding wing motors 62, 64; (2) the first and second bottom heater motors 70, 72; and, (3) the first bottom forming motor 74. The main turret motor 50 also sends a motion data (positional information) signals 61 directly to the sidewall paper die motor 60 through the sidewall paper die motor's drive. The drive of the sidewall paper die motor 60 then sends two output signals from its programmable limit switch to (1) the sidewall feeder motor 58 and (2) the transfer turret motor 54. The motion data signal 61 is also transferred to the drive of the bottom paper punch motor 68. The bottom paper punch motor 68, and in one embodiment more specifically the drive of the bottom paper punch motor 68, then sends an output signal from its programmable limit switch to the bottom paper feed motor 66.

Because additional motors require signals of the main turret motor 50 for initiating their programmed drive profiles, the preferred embodiment of the cup forming machine 10 utilizes an electronic virtual motor 52 to mirror the position of the main turret motor 50 in order to provide output signals. The electronic virtual motor 52 is not a mechanical drive motor, but rather is an electronic computerized motor which operates on an electronic one to one ratio with the main turret drive motor 50 to provide additional programmable limit switch output signals. In a preferred embodiment the three programmable limit switch output signals of the virtual motor 52 are provided to: (1) the second bottom forming linear motor 78; (2) the horizontal rimming turret motor 56; and, (3) a gate programmable limit switch 87. In turn the gate programmable limit switch 87 provides electronic signals for the controller 49 to create electronic windows to determine when sensor inputs should be evaluated. For example, the gate programmable limit switch 87 provides electronic windows for receiving signals the bottom paper detect sensor 126, etc.

Additionally, the servo drive of the horizontal turret motor 56, which receives its motion trigger signal from the virtual motor 52 that operates on an electronic one to one ration with the main turret drive motor 50, provides three programmable limit switch output signals to: (1) the tamper lube motor 82; (2) the pre-curl motor 84; and, (3) the finish curl motor 86. More specifically, however, the output signals from the programmable limit switch of the drive of the horizontal turret motor 56 are provided to the respective drives of the tamper lube motor, pre-curl motor and finish curl motor. Because a variety of axes and servo motors are utilized to independently control the various workstations, the individual workstations and the motors thereof may be substantially independently operated.

In a preferred embodiment, the main turret motor 50 has no specific drive profile. Instead, the main turret motor 50 is commanded by the main controller 49 to rotate at a constant velocity. A cam box between the main turret motor 50 and the mandrel turret 12 converts the constant rotational velocity of the main turret motor 50 into intermittent motion for the mandrel turret 12. With the use of the cam box the resultant motion of the mandrel turret 12 is 50% motion index and 50% dwell.

When the main turret drive motor 50 rotates one of the mandrels 48 into position with the bottom punch workstation 24, a bottom blank 94 is positioned on the end of the mandrel 48. In operation, the bottom punch workstation 24 and the sidewall die cutter workstation 22 operate to form the bottom blanks 94 and sidewall blanks 92, respectively. Specifically, in one embodiment the bottom punch workstation 24 has a bottom paper feed motor 66 and a bottom paper punch motor 68. In a preferred embodiment the bottom paper feed motor 66 and the bottom paper punch motor 68 are servo motors. As explained above and shown in FIG. 8, the bottom paper feed motor 66 receives a signal of a commanded drive or motion profile from the main controller 49 and an electronic signal to begin the drive profile directly from drive of the main turret motor 50. Alternatively, the main controller 49 may send both signals to the bottom paper feed motor 66. After receiving the appropriate signal, the bottom paper feed motor 66 advances the bottom paper roll at the appropriate velocity and distance such that a required amount of paper is available to be punched to form the bottom blank 94.

In a preferred embodiment, to create the bottom blank 94 the bottom punch motor 68 is commanded to drive a dual-stage bottom paper punch at a one to one ratio to the main turret 12. Therefore, like the mandrel turret motor 50, the bottom punch motor 68 rotates at a constant velocity. The dual-stage bottom paper punch operates to both shear the bottom blank from the roll of paper, and then to form the skirt of the bottom blank. First, one component of the bottom punch workstation 24 punches the paper to shear the bottom blank 94 from the continuous roll of bottom wall paper. For one size cup, at this stage the bottom blank 94 is shaped as a disc having approximately a 3" diameter. A second stage of the bottom punch workstation 24 operates to push the disc-shaped bottom blank 94 through the forming ring. The forming ring has approximately a 2.25" diameter opening. Thus, by pushing the 3" diameter disc-shaped bottom blank through the forming ring having approximately 2.25" diameter opening, the bottom blank 94 is reformed to have a substantially even 0.375" skirt portion 100 around the circumference of the bottom blank 94. Finally, an air cylinder pushes the formed bottom blank 94 into the opening 120 at the radial end 122 of the adjacent mandrel 48, and against an outward end wall 124 of the mandrel 48. Because the outward end wall 124 of the mandrel 48 in this position is located approximately 0.375" inside the radial end 122 of the mandrel 48, the edge of the skirt 100, which is approximately 0.375" long, is adjacent the radial end 122 of the mandrel 48. It is understood that the specific dimensions for the bottom blank 94 are provided for one exemplar cup shape, and a variety of different shapes, configurations and mechanisms to create the bottom blank 94 are possible without departing from the scope of the present invention.

Figure 24:
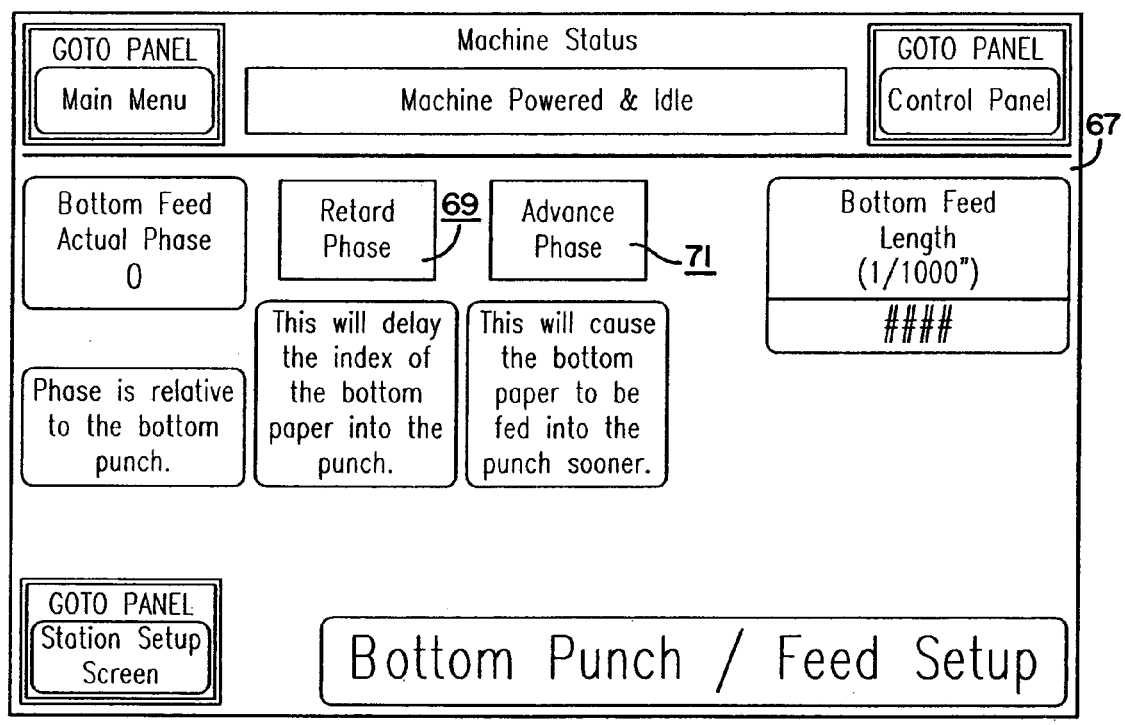
FIG. 24 is an example of a bottom punch workstation setup screen.

Because the bottom punch workstation 24 has its own paper feed motor 66 and bottom paper punch motor 68, and because the drive profile and parameters for the bottom paper feed motor 66 can be independently modified, the operation and efficiency of this workstation is greatly enhanced. For example, as shown in the bottom punch/feed setup screen 67 in FIG. 24, the machine operator may retard 69 or advance 71 the phase of the bottom feed motor 66 relative to the bottom punch motor 68. This allows the operator to either delay the index of the bottom paper into the punch, or to cause the bottom paper to be fed into the punch sooner. Additionally, the bottom feed length can also be adjusted. Further, the drive profile for the bottom paper feed motor 66 stored in the main controller 49 may also be electronically modified.

The end wall 124 of the mandrel 48 has a vacuum which operates to retain the formed bottom blank 94 secure in position. After the bottom blank 94 is inserted onto the outward end of the mandrel 48, the mandrel turret 12 is rotated two indexes such that the mandrel 48 with the bottom blank 94 is provided at the folding wing workstation 26. As the mandrel turret 12 is indexed to the folding wing workstation 26 a photo eye 126 operates to verify that a bottom blank 94 is provided in the mandrel 48.

At generally the same time that the bottom punch workstation 24 is creating and inserting the bottom blank 94 onto the mandrel 48, the sidewall feeder workstation 20 and sidewall die cutter workstation 22 are operating to create a sidewall blank 92 for the cup 46. In a preferred embodiment the sidewall feeder motor 58 and sidewall paper die motor 60 are servo motors.

In a preferred embodiment, the sidewall paper die motor 60 is commanded to drive the sidewall paper die at a one to one ratio to the main turret 12. Therefore, like the mandrel turret 12 and the bottom punch motor 68, the sidewall paper die motor 60 generally runs at a constant velocity. Accordingly, in a preferred embodiment, the drive of the sidewall paper die motor 60 is hard wired to the drive of the main turret motor 50. Additionally, like the bottom paper feed motor 66 that receives a signal from the drive of the main turret drive motor 50, the drive for the sidewall feeder motor 58 receives signals from the main controller 49 and the drive of the main turret drive motor 50 (through the drive of the sidewall paper die motor 60) such that the feeder motor 58 operates to feed the sidewall blank 94, and then the sidewall die motor 60 drives the die to cut the sidewall blank 94. More specifically, in a preferred embodiment, a drive or motion profile for the sidewall feeder motor 58 resides in the main controller 49 and this drive profile is transmitted to the drive for the sidewall feeder motor 58 from the main controller 49. The drive or motion profile sent to the drive of the sidewall feeder motor 58 is initiated based on an initiation signal received from the programmable limit switch of the drive of sidewall paper die motor 60.

In sum, based on the signals received, the sidewall feeder motor 58 operates to advance the sidewall paper roll at the appropriate time, position and velocity to the sidewall die cutter workstation 22. Similarly, the sidewall paper die motor 60 operates to reciprocate the sidewall die 130 at the appropriate time, position and velocity (based on its one to one gearing ratio with the main turret) to create the sidewall blanks 92 as described below. For example, as the die 130 gets into the proper position (i.e., as soon as it shears the paper and begins to raise up from the paper) an electronic signal is sent from the drive of the sidewall paper die motor 60 directly to the drive of the sidewall feeder motor 58 to have the sidewall feeder motor 58 begin to feed additional paper to the die 130.

In the preferred embodiment, the sidewall die cutter workstation 22 employs a progressive reciprocating die 130 that is driven by the sidewall paper die motor 60. The term progressive in reference to the sidewall die means that the trailing edge of one sidewall blank 92 and the leading edge of the following sidewall blank 92 are die cut at the same time. Additionally, the die 130 is reciprocating in that the die moves in an alternating up and down motion to cut the paper that becomes the sidewall blank 92. In a preferred embodiment, the rotary motion of the sidewall paper die motor 60 is converted into reciprocating motion for the die cutter 22. Additionally, in a preferred embodiment the shape of the die 130 for the sidewall die cutter workstation 22 is substantially U-shaped to conform with the shape of the sidewall blank 92 (see FIG. 4). More specifically, for each sidewall blank 92 the die 130 cuts the trailing edge 93 and the two longitudinal edges 95, 97. Additionally, during the same stroke the die 130 also cuts the leading edge 91 of the next sidewall blank 92.

Figure 25:
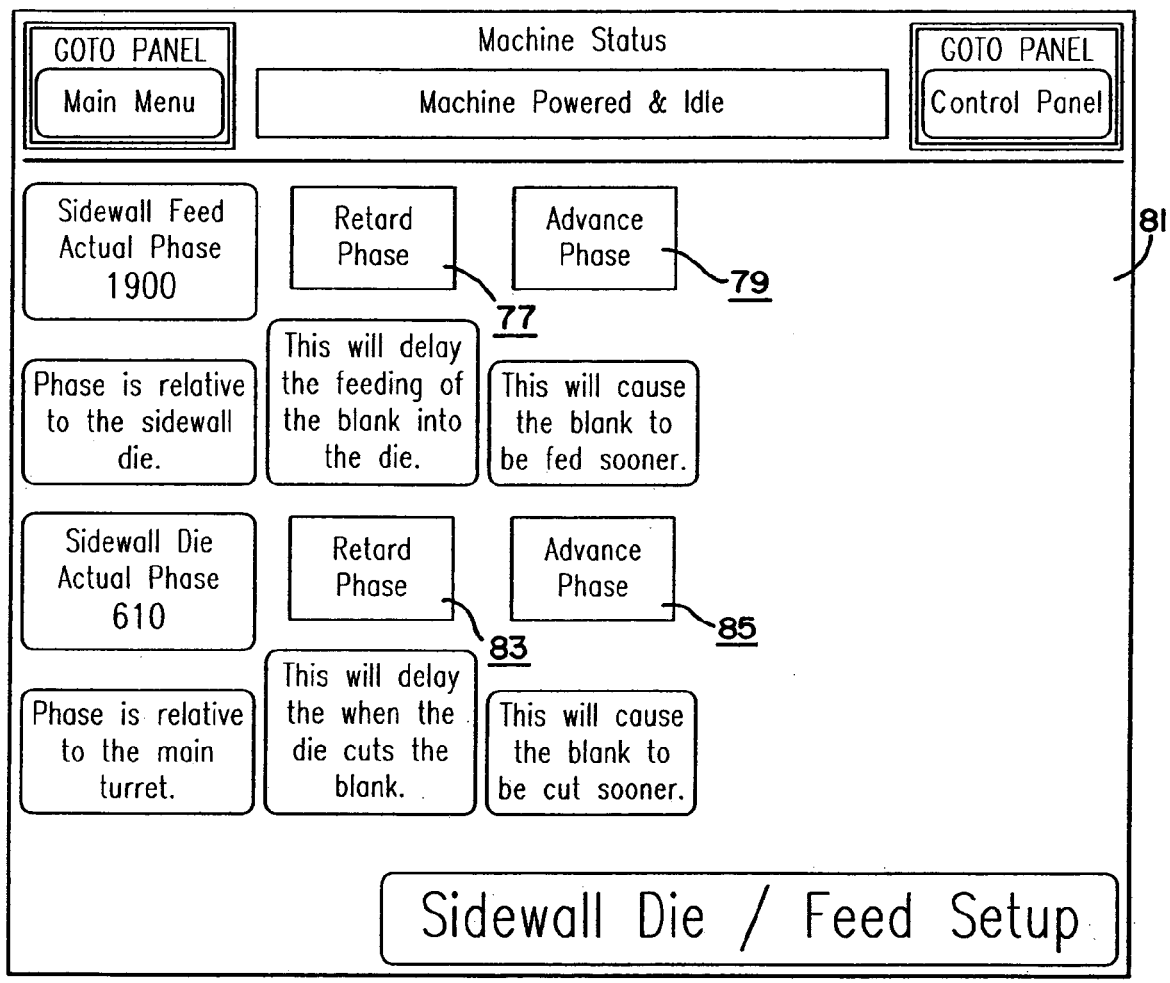
FIG. 25 is an example of a sidewall die/feed setup screen.

As with the other workstations and drives on the cup forming machine 10, the sidewall feeder workstation 20 and sidewall die cutter workstation each have their own motors identified above, and the drive profile and operating parameters for the sidewall feeder motor 58 can be independently modified. In general the operating parameters may be quantitatively modified at an input station electrically connected to the main controller 49. For example, as shown in the sidewall die/feed setup screen 81 shown in FIG. 25, at the input station the machine operator may retard 77 or advance 79 the phase of the sidewall feeder motor 58 relative to the sidewall paper die motor 60. This allows the operator to either delay the feeding of the sidewall blank paper into the die, or to cause the sidewall blank paper to be fed into the die sooner. Additionally, the machine operator may retard 83 or advance 85 the phase of the sidewall die motor 60 relative to the main turret motor 50. This allows the operator to either delay when the die cuts the blank 92, or to cause the blank 92 to be cut sooner. Further, since the drive profile for the sidewall feeder motor 58 is stored in the main controller 49 and can be electronically modified.

Figure 9B:
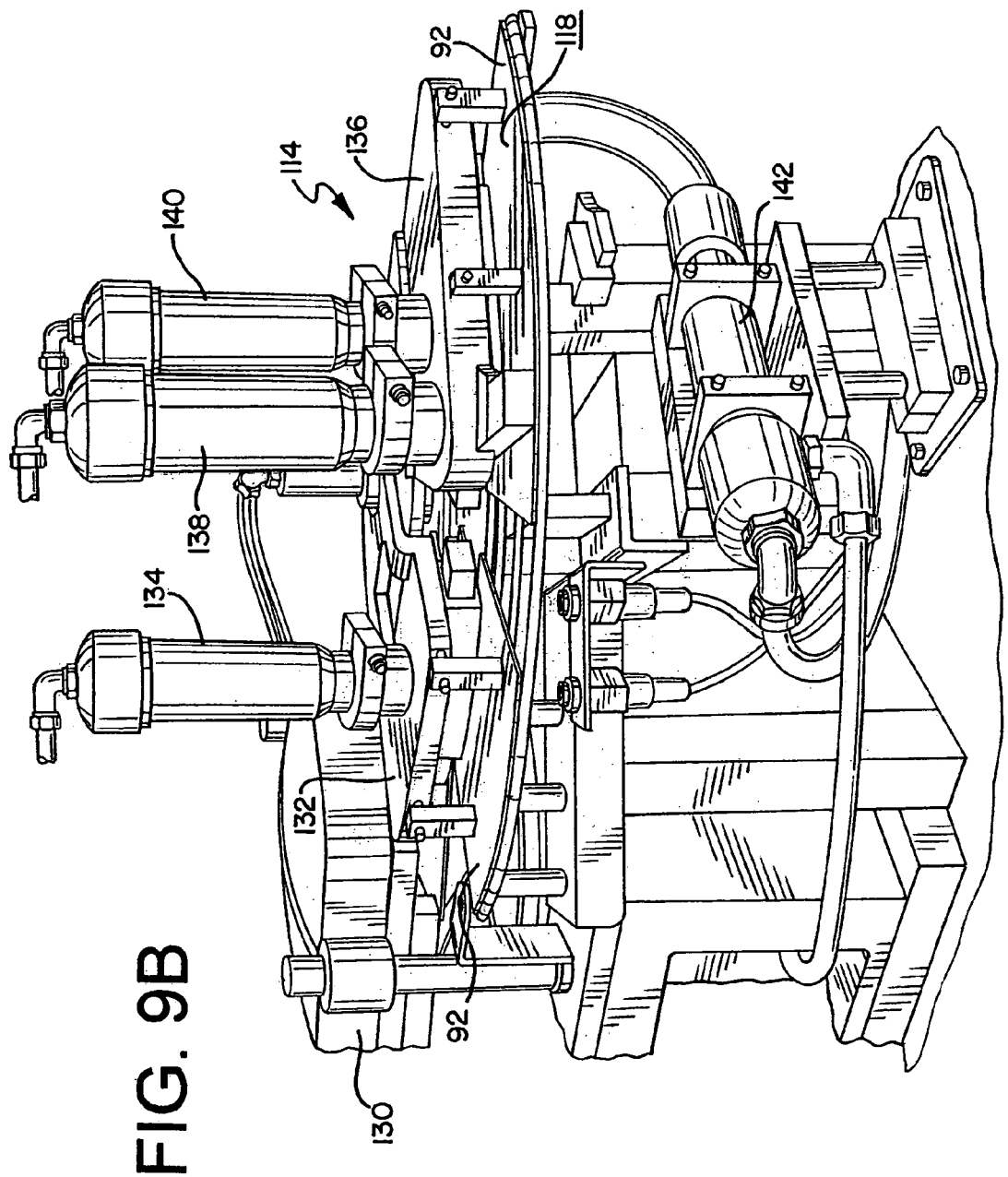
FIG. 9B is a top plan view of the transfer turret assembly with the heaters removed.

Referring to FIGS. 9A and 9B, as the roll of paper which is cut to form the sidewall blank 92 is fed into position by the sidewall feeder motor 58, a pair of fingers 128 on the transfer turret 14 grasps the sidewall blank 92 at the leading edge 91 thereof. The fingers 128 are operated (i.e., opened and closed) by a cam follower that is manipulated by a cam driven by the sidewall die motor 60, which operates on a one to one drive ratio with the main turret 12. Accordingly, in one embodiment at a specific position of rotation of the transfer turret 14 the fingers 128 are opened and closed to fixedly accept the sidewall blank 92, and at another specific position of rotation of the transfer turret 14 the fingers 128 are opened to release the sidewall blank 92 to the folding wing workstation 26. The fingers 128 provide to ensure that the roll of paper is positively held and the position is accurately known both prior to cutting the paper and after the blank 92 is cut. In a preferred embodiment, the transfer turret 14 has five stations on the transfer turret 14, each station spaced approximately 72°. Each of the stations has a set of fingers 128 which can be adjusted to selectively retain and release a sidewall blank 92. Generally immediately after the fingers 128 grasp the roll of paper at the leading edge 91, the die 130 of the sidewall die cutter workstation 22 performs the task of cutting the three remaining sides of the sidewall blank 92.

Figure 26:
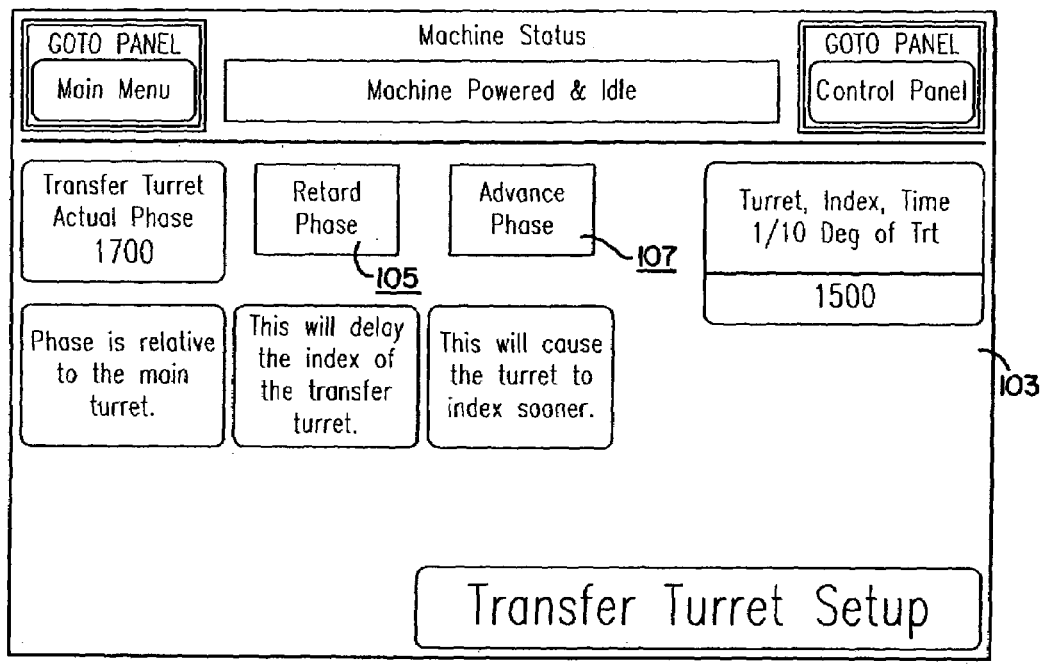
FIG. 26 is an example of a transfer turret setup screen.

In a preferred embodiment, the transfer turret motor 54 is a servo motor. As explained above and shown in FIG. 8, the drive of the transfer turret motor 54 receives a drive or motion profile signal from the main controller 49 and another signal, a command signal, to begin the drive profile via the programmable limit switch output from the drive of the sidewall paper die motor 60. Because the transfer turret 14 has its own motor 54, and because the drive profile and parameters for this motor 54 can be independently modified, the operation and efficiency of this turret is greatly enhanced. For example, as shown in the transfer turret setup screen 103 in FIG. 26, the machine operator may retard 105 or advance 107 the phase of the transfer turret motor 54 relative to the main turret motor 50. This allows the operator to either delay the index of the transfer turret, or to cause the transfer turret to index sooner. Also, the drive or motion profile for the transfer turret motor 54 that is stored in the main controller 49 may also be electronically modified.

After the sidewall blank 92 is cut, the transfer turret 14 is rotationally advanced by the transfer turret motor 54 to subsequent radial locations to heat the polyethylene coating on the sidewall blank 92 for forming the longitudinal sidewall seam 96 at the folding wing workstation 26, and to pre-heat the lower region 104 of the sidewall blank 92 for forming the bottom seal 98 at the second bottom forming workstation 34. At the first heating location 132, heat in the form of hot air is blown on the lower region 104 of the inner surface 118 of the sidewall blank 92 adjacent the leading edge 91 thereof. In one example, the first heating location 132 has one heater 134. The transfer turret 14 is then rotationally advanced to move the sidewall blank 92 to the second heating location 136. The second heating location 136 has 3 heaters. The first heater 138 at the second heating location 136 is utilized to provide heat, in the form of hot air, to the longitudinal edges 95, 97 of the inner surface 118 of the sidewall blank 92; the second heater 140 at the second heating location 136 is utilized to provide heat, in the form of hot air, to the lower region 104 of the inner surface 118 of the sidewall blank 92 adjacent the leading edge 91 thereof; and, the third heater 142 is utilized to provide heat, in the form of hot air, to the longitudinal edges 95, 97, but at the outer surface of the sidewall blank 92. Thus, the heater 134 at the first heating location 132, and the first and second heaters 138, 140 at the second heating location 136 are provided on the top or upper side of the transfer turret 14, while the third heater 142 at the second heating location 136 is provided on the under side of the transfer turret 14. In a preferred embodiment, each of the heaters 134, 138, 140, 142 comprise a stainless steel cylinder housing an electric cartridge heater. The heater is energized and air is blown past the heater to heat the air. The heated air is then expelled from the heater at a manifold to diffuse the heated air on the appropriate locations on the sidewall blank 92. It is understood that additional means for heating the polyethylene coating are possible, such as electric or gas radiant heat.

Finally, the transfer turret 14 is rotationally advanced to move the sidewall blank 92 to the folding wing workstation 26. At the folding wing workstation 26 the sidewall blank 92 is transferred from the transfer turret 14 to the main or mandrel turret 12. For each advance or index rotation of the main turret 12 another mandrel 48 with a bottom blank 94 is provided at the folding wing workstation 26 and adapted to receive a sidewall blank 92.

Figure 10:
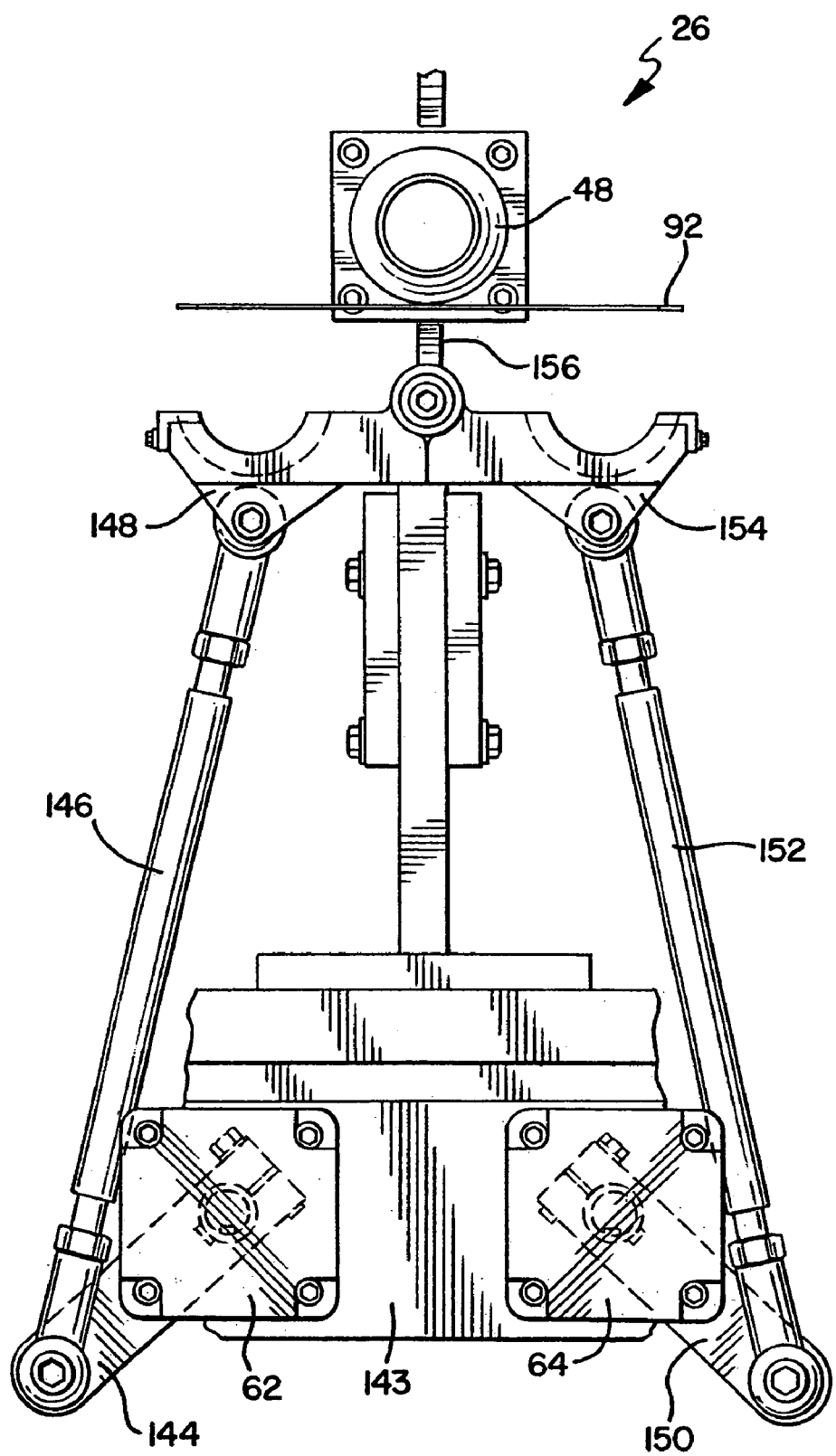
FIG. 10 is an elevation view of the folding wing workstation in a disengaged position.

Referring to FIG. 10, the folding wing workstation 26 comprises a mounting bracket 143, a left folding wing motor 62, a right folding wing motor 64, a left crank arm 144, a left connector 146, a left folding wing 148, a right crank arm 150, a right connector 152, a right folding wing 154 and a foot clamp 156. The left crank arm 144 is connected to the left folding wing motor 62, and the left connector 146 is connected at one end to the left crank arm 144 and at the other end to the left folding wing 148. Similarly, the right crank arm 150 is connected to the right folding wing motor 64, and the right connector 152 is connected at one end to the right crank arm 150 and at the other end to the right folding wing 154. The left and right folding wing motors 62, 64 are mounted to the mounting bracket 143, and the left and right folding wings 148, 154 are pivotally connected to a common pivot member of the mounting bracket 143. Accordingly, both the left and right folding wings 148, 154 pivot about the same point. The folding wing workstation 26 generally operates to wrap the sidewall blank 92 around the mandrel 48 and form the frustoconically shaped sidewall of the formed cup 90.

In a preferred embodiment, the left and right folding wing motors 62, 64 are servo motors. Each of the respective drives of the folding wing motors 62, 64 receive a drive profile signal, which as with all the drive profile signals contains the appropriate drive profile for the drive of the servo motor, from the main controller 49. Additionally, as explained above and shown in FIG. 8, each of the drives of the folding wing motors 62, 64 receives a signal directly or indirectly from the drive of the main turret drive motor 50 to begin their respective drive profiles.

Figure 11:
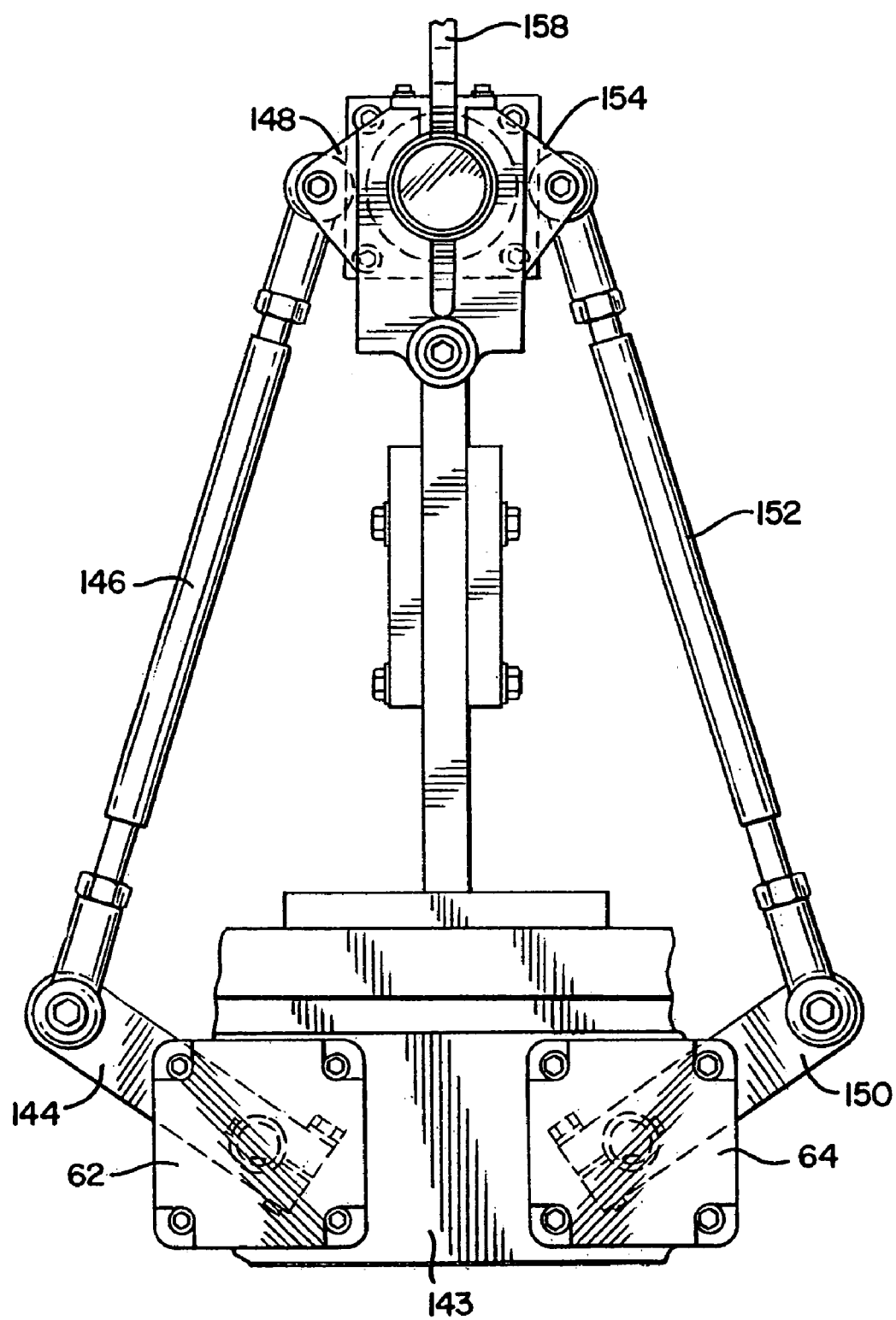
FIG. 11 is an elevation view of the folding wing workstation in an engaged position.

In operation, after the transfer turret 14 having a sidewall blank 92 and the main turret 12 having a mandrel 48 with a bottom blank 94 are advanced into an aligned position, the sidewall blank 92 is located directly under the mandrel 48. In the disengaged position (FIG. 10), the folding wings 148, 154 are in a lowered position to allow the transfer turret 14 to advance the sidewall blank 92 into position, and to allow the mandrel turret 14 to advance into the aligned position with the folding wing workstation 26. After the sidewall blank 92 is in the aligned position under the mandrel 48, the foot clamp 156 of the folding wing workstation 26 is raised to positively clamp the sidewall blank 92 to the bottom of the mandrel 48. Once the foot clamp 156 secures the sidewall blank 92 to the bottom of the mandrel 48, the fingers 128 of the transfer turret 14 are lifted to release the sidewall blank 92 from the transfer turret 14, and the folding wings 148, 154, are raised to fold the sidewall blank 92 around the mandrel 48. The raising of the foot clamp 156 to engage the sidewall blank 92 and the releasing of the sidewall blank 92 by the fingers 128 is initiated by cam action driven by the main turret 12. Each of the folding wings 148, 154 are manipulated by separate folding wing motors 62, 64. Accordingly, as the left folding wing motor 62 is driven the left crank arm 144 is rotated. When the left crank arm rotates 144 the left connector 146 moves up and down. Subsequently, since the left connector 146 is rotatably connected to the left folding wing 148 that is pivotally connected to the mounting bracket 143, when the left connector 146 moves up and down the left folding wing 148 is manipulated to wrap the left folding wing 148, and the side of the sidewall blank 92 positioned thereover about the mandrel 48. The same operation occurs with the right folding wing 154 and the other side of the sidewall blank 92. This is referred to as the engaged position of the folding wing workstation 26, and is shown in FIG. 11.

As explained above, the longitudinal sidewall seam 96 is created by an overlapping joint between the first and second opposing longitudinal edges 95, 97 of the sidewall blank 92. To create this overlapping joint 96, one of the folding wings must complete its folding of the sidewall blank 92 around the mandrel 48 prior to the opposing side of the sidewall blank 92. In a preferred embodiment both folding wings 148, 154 start their movement at the same time, however, one of the folding wings (typically the left folding wing 148) is commanded to complete its motion in slightly less time than the right folding wing 154. By having one folding wing complete its motion before the other folding wing an overlap is created at the side seam joint 96. After both of the folding wings 148, 154 are wrapped around the mandrel 48, thereby forming the frustoconical sidewall blank 92 of the cup 90 with an overlapping longitudinal side seam 96, a seal clamp 158 from the mandrel turret 12 clamps down on the seam 96 to sealingly join the opposing longitudinal edges 95, 97 of the sidewall blank 92. The seal clamp 158 is a component of the mandrel turret 12 and rotates with the mandrel turret 12. The seal clamp 158 maintains a clamping pressure on the sidewall 92 of the cup until the seal clamp 158 is released, explained later herein, when the mandrel 48 of the main turret 12 is associated with a mating cup receiver 300 of the horizontal pocket or rimming turret 16. The longitudinal seal 96 is created by the adherence of the heated polyethylene on the interior surface 118 of the outer overlapping edge 95 or 97 of the sidewall blank 92 against the outer surface of the opposing inner overlapping edge 95 or 97 of the sidewall blank 92. After the seal clamp 158 clamps the formed sidewall blank 92 to the mandrel 48, the foot clamp 156 releases the bottom of the sidewall blank 92 and the folding wings 148, 154 are rotated away from the mandrel 48 and back to the lowered or disengaged position as shown in FIG. 10.

Because this embodiment of the folding wing workstation 26 for the cup forming machine 10 has separate motors 62, 64 for each of the left and right folding wings 148, 154, both of which are separately controllable, the cup machine 10 can control which folding wing 148, 154 finishes the folding of the sidewall blank 92 prior to the other folding wing 148, 154. The ability to control this feature electronically allows the cup forming machine 10 to create cups 90 with either a left-over-right longitudinal seal 96 or a right-over-left longitudinal seal 96. Additionally, the motion profile (i.e., the timing, distance, velocity) of each of the folding wings 148, 154 can be independently controlled and manipulated merely by adjusting the drive parameters and/or drive profile. For instance, different paperboard may require the folding arms to fold the paper at a lower acceleration than other paperboard to avoid disturbing the paperboard. An example of one motion profile for the folding wing workstation 26 is shown in FIG. 12. In that example, the left and right folding wings 148, 154 begin to fold the sidewall blank 92 at approximately the same time, but the left wing 148 finishes folding its side of the sidewall blank 92 prior to the right wing 154 to create the overlap for the longitudinal seal 96.

Figure 27:
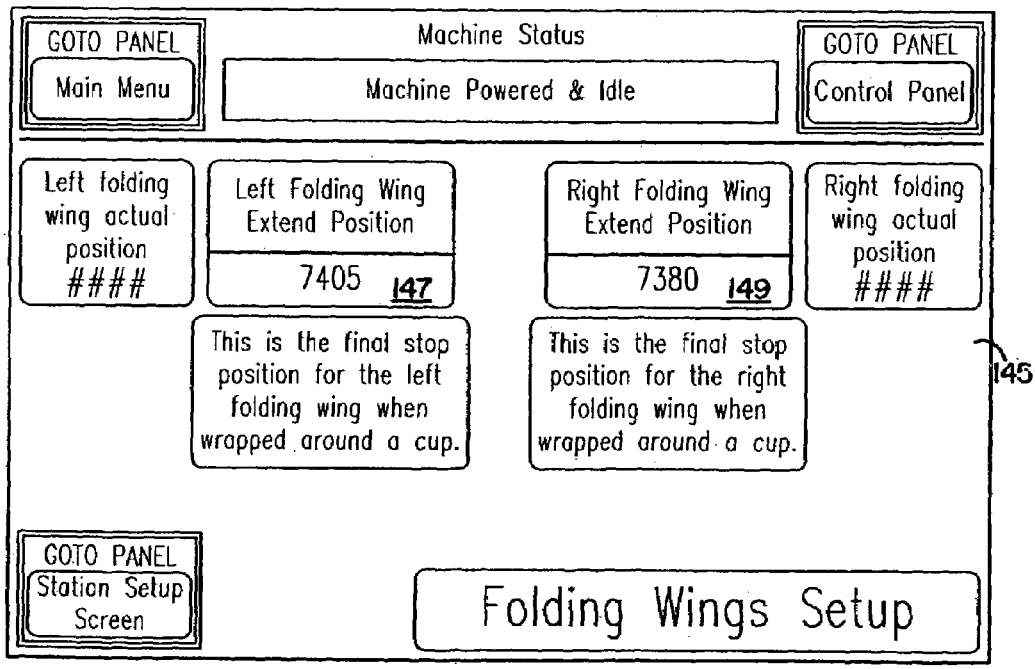
FIG. 27 is an example of a folding wing setup screen.

Further, because the folding wing workstation 14 has its own motors 62, 64, and because the drive profile and parameters for these motors 62, 64 can be independently modified, the operation and efficiency of this workstation is greatly enhanced. For example, as shown in the folding wing setup screen 145 in FIG. 27, the machine operator may manipulate the stop position 147 of the left folding wing, as well as the stop position 149 of the right folding wing. This allows you to adjust the tightness of the wrap based on various thicknesses of paper being run.

Figure 13:
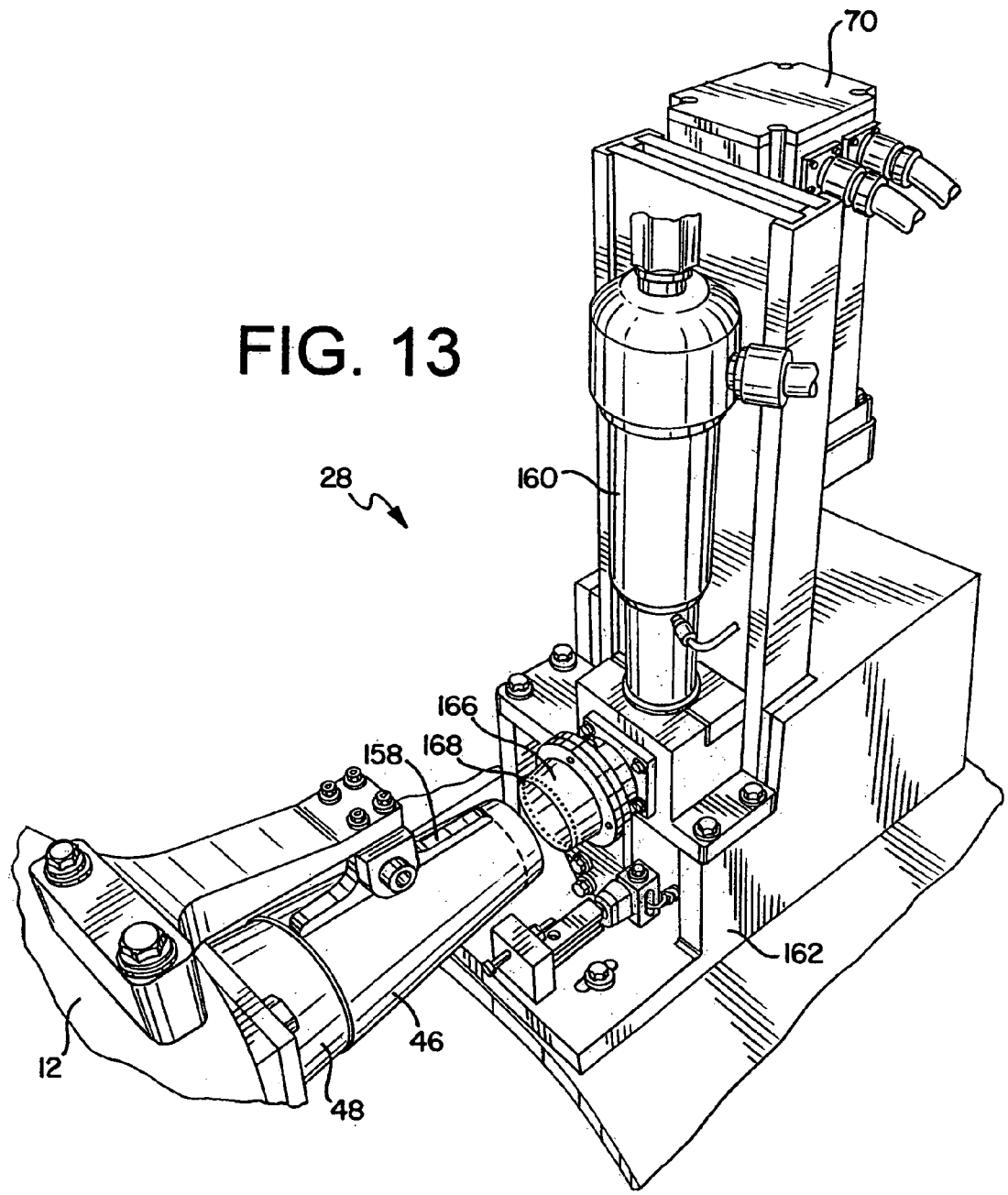
FIG. 13 is a perspective view of a bottom heating workstation.

After the sidewall blank 92 is wrapped around the mandrel 48 and the folding wing assembly 26 has returned to the disengaged position (i.e., FIG. 10), the main turret 12 is advanced to the next workstation for further processing of the partially formed cup 46. In one embodiment, as shown in FIG. 1, the next workstation is the first bottom heater workstation 28, which is shown in FIG. 13. The first bottom heater workstation 28 operates to heat the polyethylene on the inside surface 118 of the distal end portion 112 of the sidewall blank 92. As explained above with respect to the heaters downstream of the sidewall die cutter workstation 22, the heater 160 for the first bottom heater workstation 28 comprises a stainless steel cylinder housing an electric cartridge heater. The heater is energized and air is blown past the heater to heat the air. The heated air is then expelled from the heater at a manifold to diffuse the heated air on the appropriate locations on the sidewall blank 92.

As shown in FIG. 13, the first bottom heater workstation 28 generally comprises a mounting fixture 162, a first heater motor 70, a heater 160, a heater tool/diffuser 166, and a drive fork and cam assembly to convert the rotational motion of the first heater motor 70 to linear motion of the heater tool 166. In a preferred embodiment the first heater motor 70 is a servo motor.

In general a drive of the first heater motor 70 receives a signal from at least one of the main controller 49 and a controller for the main turret motor 50, and in response to that signal the first heater motor 70 moves the heater tool 166 into and out of the recessed area 116 of the bottom of the cup 90 according to a specific drive profile. In a preferred embodiment the drive profile for the first heater motor 70 resides in the main controller 49. The drive profile is transmitted to the drive of the first heater motor 70 from the main controller 49. Further, in a preferred embodiment the drive of the first heater motor 70 receives an electronic command signal to begin its motions. As explained above, when the main motor 50 cycles its drive sends out signals to the various components at different positions of its cycle. At a specific instance in its cycle the drive of the main turret motor 50 sends out a signal to the drive of the first heater motor 70 to have that motor initiate its programmed drive profile.

The end of the heater tool 166 is cylindrically shaped and has a plurality of apertures 168 about its circumference. Heated air is forced into a central cavity of the heater tool 166 and is then forced out of the apertures 168 to heat the polyethylene on the inside surface 118 of the sidewall blank 92. More specifically, in a preferred embodiment for one size cup 90, when the sidewall blank 92 is wrapped around the mandrel 48 the distal end portion 112 of the sidewall blank 92 extends approximately 0.750" past the end 122 of the mandrel 48 and this portion of the sidewall blank 92 is heated. The profile for the first heater motor 70 is designed such that heater tool/diffuser 166 is inserted into the recessed area 116 immediately as the mandrel 48 is properly positioned. Further, because the first bottom heater workstation 28 has its own drive motor 70, and because the drive profile for the first heater motor 70 can be independently modified, the heater tool 166 can be inserted and removed from the recessed area 116 at a faster rate, thereby allowing more dwell time for the heater tool 166 to provide increased heat to the sidewall blank 92 for an excellent bottom seal. Providing increased dwell time for each workstation of the cup forming machine 10 is one feature of the present invention. It is understood that the dwell for substantially each of the workstations of the cup forming machine 10 may be adjusted at the input station 51 and set independent of the machine speed of the cup forming machine 10. Additionally, it is understood that the input station 51 is electrically connected to the main controller 49, and various parameters for the motors can be quantitatively controlled and adjusted at the input station 51 of the main controller 49.

Figure 28:
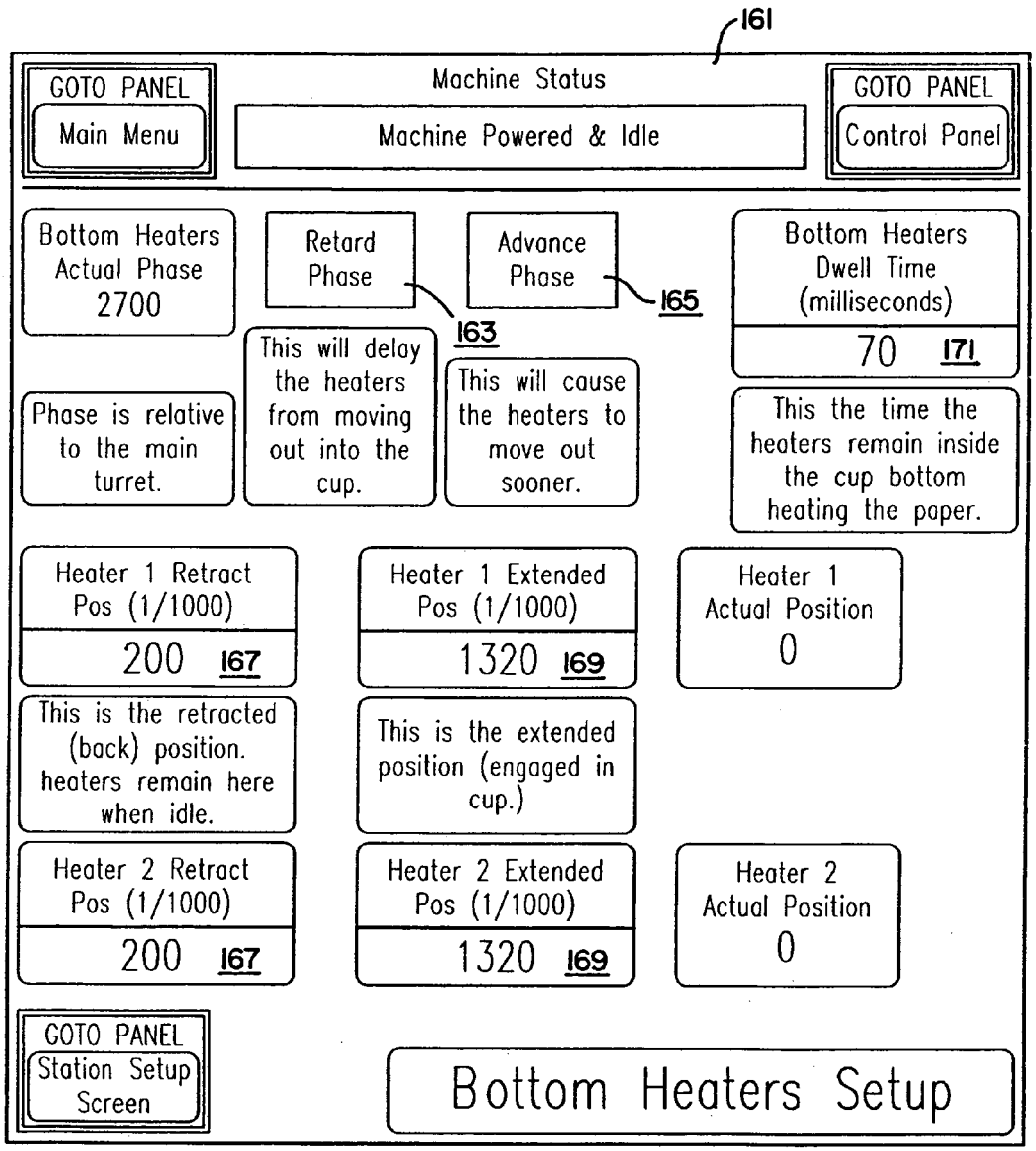
FIG. 28 is an example of a bottom heater setup screen.

An example of a bottom heater setup screen 161 is shown in FIG. 28. As shown, the machine operator may retard 163 or advance 165 the phase of the bottom heater motor 70 relative to the main turret motor 50 to either delay the heater tool/diffuser 166 from moving into the recessed area 116 or cause the heater tool 166 to move into the recessed area 116 more quickly. Further, the setup screen 161 allows the operator to adjust the retracted position 167 and extended position 169 of the heater tool 166, as well as to adjust the dwell time 171 (i.e., the time the heater tool 166 remains inside the recessed area 116 to heat the cup). Additionally, the drive profile for the first heater motor 70 that is stored in the main controller 49 may also be electronically modified.

Next, the main turret 12 advances the mandrel 48 and partially formed cup 46 to the second bottom heater workstation 30. As the main turret 12 is advanced to the second bottom heater workstation 30, the end wall 124 of the mandrel 48 is advanced radially outward 0.375". Thus, the edge of the skirt portion 100 of the bottom blank 94 is positioned 0.375" outside the mandrel 48 opening, and is adjacent the inside surface 118 of the distal end portion 112 of the sidewall blank 92. At the second bottom heater workstation 30 the polyethylene of the surface of the skirt 100 facing the recessed area 116 is heated. The second bottom heater workstation 30 has a similar components and operation to the first bottom heater workstation 28, and as such reference to FIG. 13, and the disclosure above relating to the first bottom heater workstation 28 is appropriate. As explained above, like the operation of the first heater motor 70, the drive of the second heater motor 72 receives a signal from at least one of the main controller 49 and a drive for the main turret motor 50, and in response to the one or more signals the second heater motor 72 moves the heater tool 166 into and out of the recessed area 116 of the bottom of the cup 90 according to a specific drive profile. In a preferred embodiment, the drive for the second heater motor 72 receives a command drive profile from the main controller 49. Additionally, the drive of the main turret motor 50 sends an electronic signal from its programmable logic switch as a pre-programmed position is reached to the drive for the second heater motor 72 to have the drive profile initiated at the second heater motor 72. Accordingly, like the first bottom heater workstation 28, the second bottom heater workstation 30 has its own drive motor 72 and drive profile therefore to allow for nearly complete control and manipulation of the second bottom heater workstation 30.

After the inner surface 118 of the sidewall blank 92 and the inner surface of the skirt 100 have been heated at the first and second heater workstations 28, 30, respectively, the main or mandrel turret 12 is advanced to the first bottom forming workstation 32 (See FIG. 1). The first bottom forming workstation 32 is shown separately in FIG. 14. The first bottom forming workstation 32 generally comprises a workstation that bends a portion of the distal end portion 112 of the sidewall blank 92 over the skirt 100 of the bottom blank 94 to prepare the cup for sealing of the sidewall blank 92 to the bottom blank 94 to form the bottom seal 98 of the cup 90.

Figure 14:
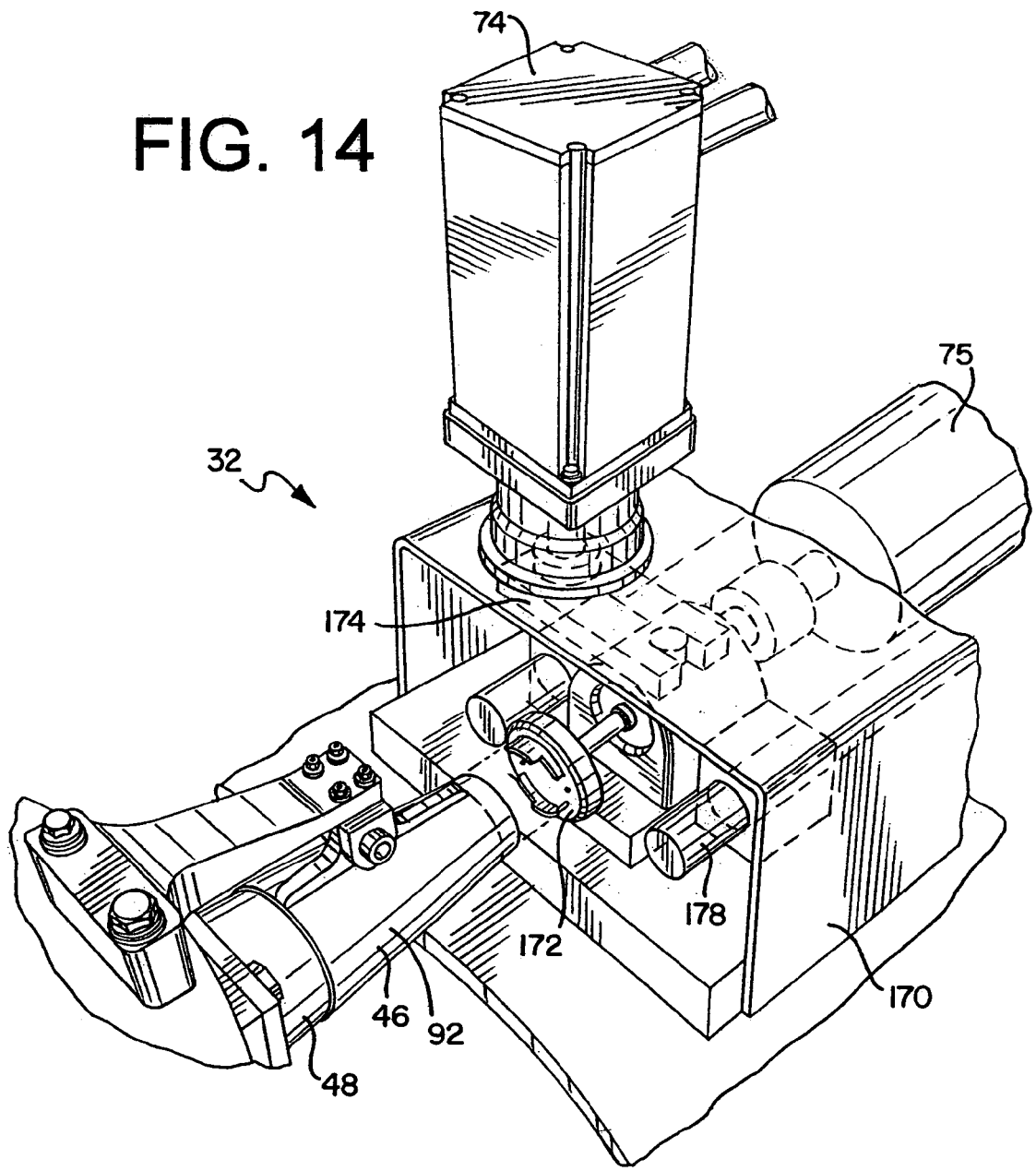
FIG. 14 is a perspective view of the first bottom forming workstation.

Referring to FIG. 14, the first bottom forming workstation 32 generally comprises a mounting fixture 170, a first bottom forming linear motor 74, a reformer tool 172, a drive fork 174 to assist in converting the rotational motion of the first bottom forming motor 74 to linear motion for the reformer tool 172, a constant rotation motor 75 to rotate the reforming tool 172, and a slide mechanism 178 to allow the reforming tool 172 to move inward and outward. In general, the constant rotation motor 75 is a conventional AC motor that continually rotates the reformer tool 172 at a constant rate of revolution. The constant rotation motor 75 is connected to the reforming tool 172 via a ball/spline mechanism, and the reforming tool 172 is connected to the slide mechanism 178. Alternatively, the constant rotation motor 75 may be fixed to the slide mechanism 178. The ball/spline mechanism allows the reforming tool 172 to move in and out while still being rotated by the constant rotation motor 75. The first bottom forming motor 74 provides the drive to move the slide mechanism 178, including the rotating reforming tool 172, inward and outward. More specifically, the drive fork 174 that is connected to the drive shaft driven by the bottom forming motor 74 manipulates a cam follower extending from the slide mechanism 178.

Figure 6:
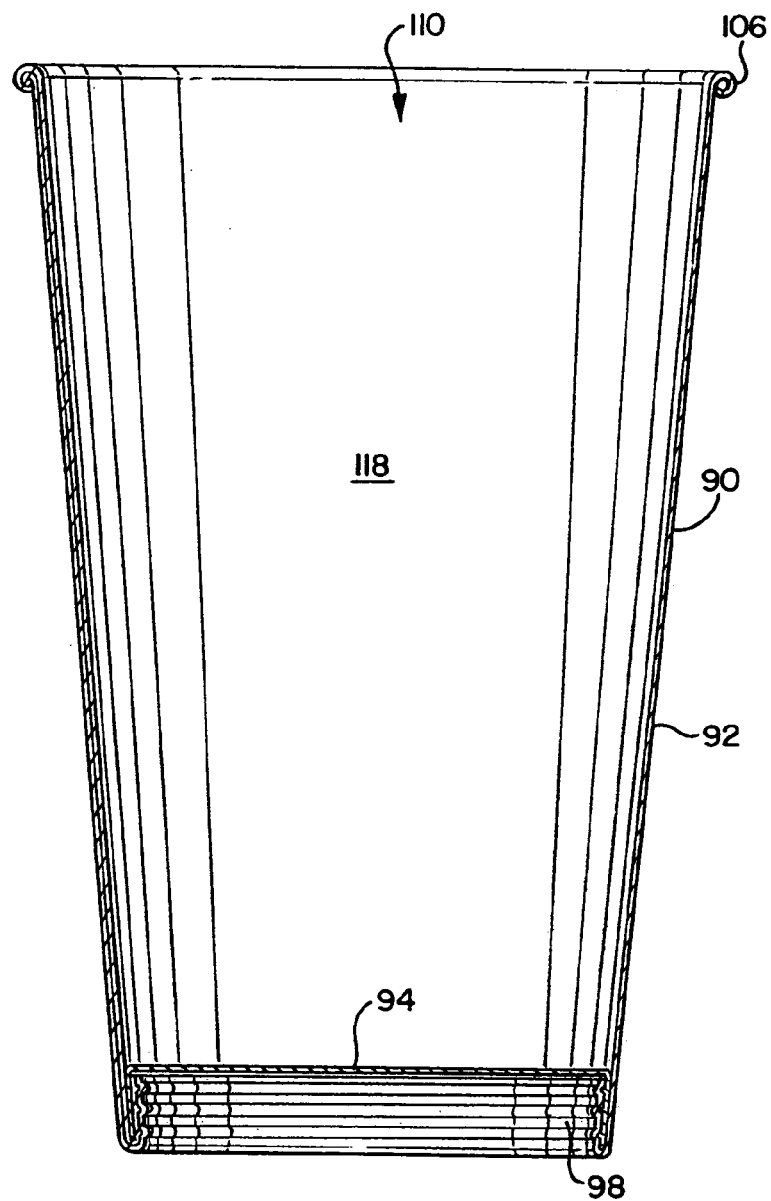
FIG. 6 is a cross-sectional view about line 6—6 of the cup of FIG. 3.
Figure 7:
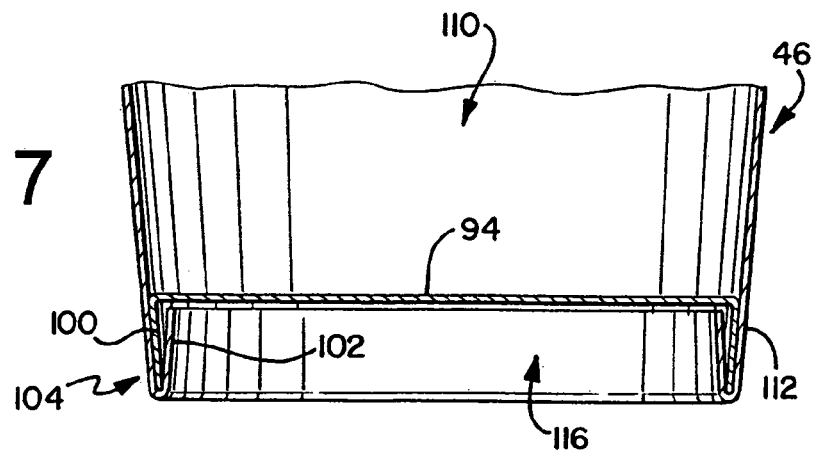
FIG. 7 is a cross-sectional view of a partially formed cup.

In a preferred embodiment the first bottom forming motor 74 is a servo motor. In general, the drive of the first bottom forming motor 74 receives a drive or motion profile in the form of a drive profile signal from the main controller 49, and an electronic signal to trigger the motion from the main turret motor 50. In response to the signal from the main turret motor 50 the first bottom forming motor 74 initiates its drive profile and moves the slide mechanism 178 having the reforming tool 172 inward to engage the sidewall 92 of the partially formed cup 46. In a preferred embodiment the drive or motion profile for the first bottom forming motor 74 resides in the main controller 49. The drive profile is transmitted to the drive of the first bottom forming motor 74 from the main controller 49. Further, in a preferred embodiment the drive of the first bottom forming motor 74 receives a hard-wired signal from the drive of the main turret motor 50, and more specifically from the programmable limit switch of the drive of the main turret motor 50. As the main motor 50 cycles its drive sends out signals to the various components at different positions of its cycle. At a specific position in its cycle the drive of the main motor 50 sends out a signal to the drive of the first bottom forming motor 74 to have that motor initiate its programmed drive or motion profile, which generally moves the reforming tool 172 inward toward the mandrel 48 at a rapid velocity and for a specific distance to engage the sidewall 92, then it slows to a lower speed as it completes approximately the last 0.375" of movement (which provides to curl or bend the paper), and then dwells for a period of time to eliminate the jerk effect of reversing motions. Finally, the first bottom forming motor 74 reverses backward at a rapid velocity to disengage the sidewall 92. In general, the function of the first bottom forming workstation 32 is to bend the distal end portion 112 of the sidewall blank 92 radially inwardly to create the bent lip 102 of the sidewall blank 92. The bent lip 102 of the sidewall blank 92 is positioned over the skirt 100 of the bottom blank 94, as shown in FIG. 7, such that the second bottom forming workstation 34 can seal the distal end portion 112 of the sidewall blank 92 to the skirt 100 of the bottom blank 94 to form the bottom seal 98, as shown in FIG. 6.

Figure 29:
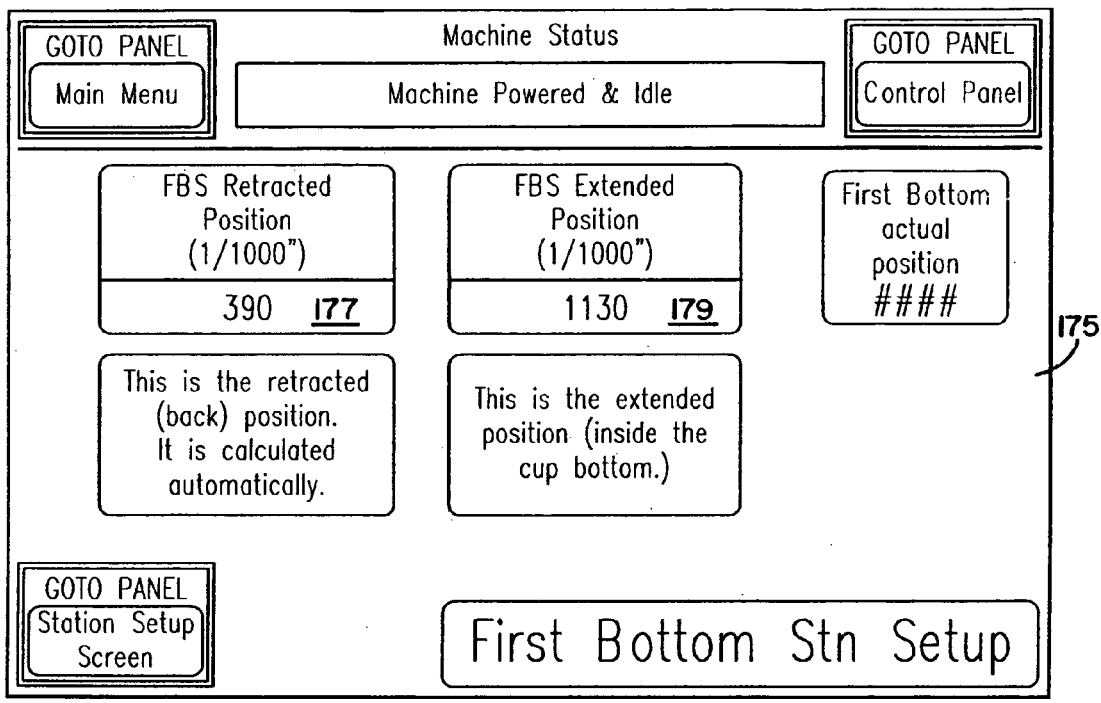
FIG. 29 is an example of a first bottom forming setup screen.

An example of a first bottom forming setup screen 175 is shown in FIG. 29. As shown, the machine operator may adjust the extended position 179 of the reforming tool 172, which automatically adjusts the retracted position 177 based on an internal calculation by the main controller 49.

After the distal end portion 112 of the sidewall blank 92 has been bent over the skirt 100 at the first bottom forming workstation 32, the mandrel turret 12 is advanced to the second bottom forming workstation 34 (See FIG. 1). The second bottom forming workstation 34 is shown separately in FIGS. 15–21. The second bottom forming workstation 34 generally irons or seals the distal end portion 112 of the sidewall blank 92 around the skirt 100 of the bottom blank 94 to form the bottom seal 98 of the cup 90 (see FIGS. 6 and 7). To perform this function a bottom seal tool 210 having a patterned circumference applies a substantially uniform pressure over the entire circumference of the distal end portion 112 of the cup after the bent lip 102 of the sidewall blank 92 is positioned over the skirt 100 of the bottom blank 94. This function, however, is complicated by the fact that a typical cup 90 is formed at an approximate 5° taper angle to the central longitudinal axis of the cup 90. Thus, engaging the bottom seal tool 210 to the cup 90 is made more difficult. To perform this function the bottom seal tool 210 must first be moved linearly into the recessed area 116 at the bottom of the cup 90, and then moved laterally or radially outward toward the bent lip 102 over the skirt 100 to engage these components for applying the pressure necessary to create the bottom seal 98. As is explained in detail below, to achieve this motion one embodiment of the present invention utilizes offset bores in a rotating barrel and an eccentric shaft, in combination with a phase adjustment motor 76, to change the center of rotation of the bottom seal tool 210 relative to the center of the cup 90.

Referring to FIGS. 15–21, the second bottom forming workstation 34 generally comprises a linear motion assembly 200 to assist the bottom sealing tool 210 in moving linearly into and out of the recessed area 116 of the cup 90, a constant rotation assembly 202 to move the bottom seal tool 210 in a circle, a phase change assembly 204 to adjust the radius of the circle in which the bottom seal tool 210 moves (i.e., to move the bottom seal tool 210 outward to engage the bent lip 102 and skirt 100 and then back inward after the bottom seal 98 is created), and a tracking assembly 206 for monitoring the rotation of the various components of the phase change assembly 204, each of which are mounted to a mounting assembly 208. These assemblies of the second bottom forming workstation 34 work together to manipulate the bottom seal tool 210 such that it seals the skirt 100 to the distal end portion 112 and bent lip portion 102 of the sidewall blank 92 to create the bottom seal 98 for the cup 90 as shown in FIG. 6.

Figure 16:
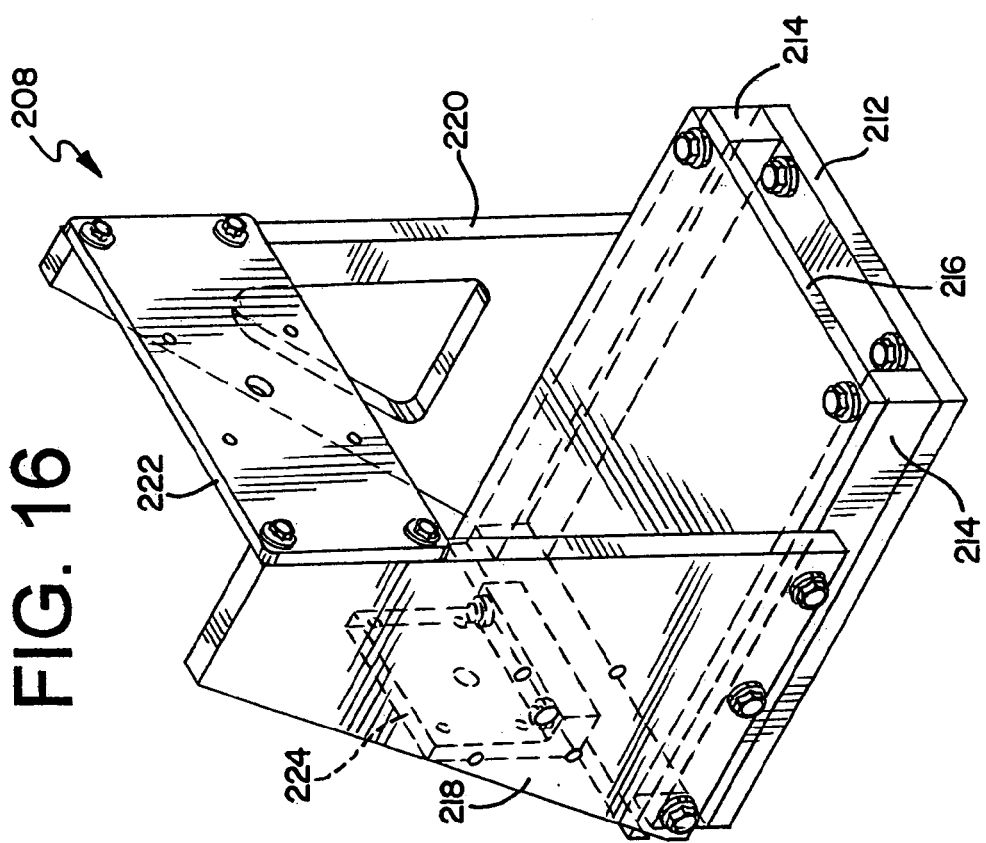
FIG. 16 is a perspective view of the mounting assembly of the second bottom forming workstation of FIG. 15.

One example of the mounting assembly 208 of the second bottom forming workstation 34 is shown in FIG. 16, and includes a mounting plate 212, a two opposing risers 214, a main plate 216, a first support bracket 218 for supporting the second bottom forming lateral motor 78, a second opposing support bracket 220, a first motor mount plate 222 for supporting the second bottom forming rotary motor 80, and a second motor mount plate 224 for supporting the second bottom forming phase adjustment motor 76. The mounting plate 212 and the main plate 216 are located in substantially parallel spaced relation, and the two risers 214 are secured between the mounting plate 212 and the main plate 216 to maintain the spaced relation therebetween. As such, the risers 214 operate to raise the main plate 216 up from the machine table. The first support bracket 218 extends transverse, and substantially perpendicular to the main plate 216 and the mounting plate 212, and the first support bracket 218 is secured at its bottom end to one of the risers 214. The second support bracket 220 also extends transverse and substantially perpendicular to the main plate 216 and the mounting plate 212 in an opposing spaced relation to the first support bracket 218. The second support bracket 220 is secured at its bottom end to the other of the risers 214. The first motor mount plate 222 is positioned at the front and toward a top of the first and second support brackets 218, 220, and is further fixedly connected to the first and second support brackets 218, 220. When assembled, the first motor mount plate 222 is located in a plane substantially parallel to a plane at the front face of the bottom seal forming tool 210. The second bottom forming rotary motor 80 is connected to a rear face 223 of the first motor mount plate 222, and the drive shaft 274 of the second bottom forming rotary motor 80 extends through an aperture in the first motor mount plate 222 for driving the constant rotation assembly 202 as explained below. The first motor mount plate 222 also aids in adding rigidity to the first and second support brackets 218, 220, and to the overall mounting assembly 208. Finally, the second motor mount plate 224 is provided at a generally rear portion of the mounting assembly 208 to support the second bottom forming phase adjustment motor 76. The second motor mount plate 224 is located in substantially parallel spaced relation to the first motor mount plate 222, and as such is extends transversely upward from the main plate 216 and substantially perpendicular to the first and second support brackets 218, 220.

Figure 17:
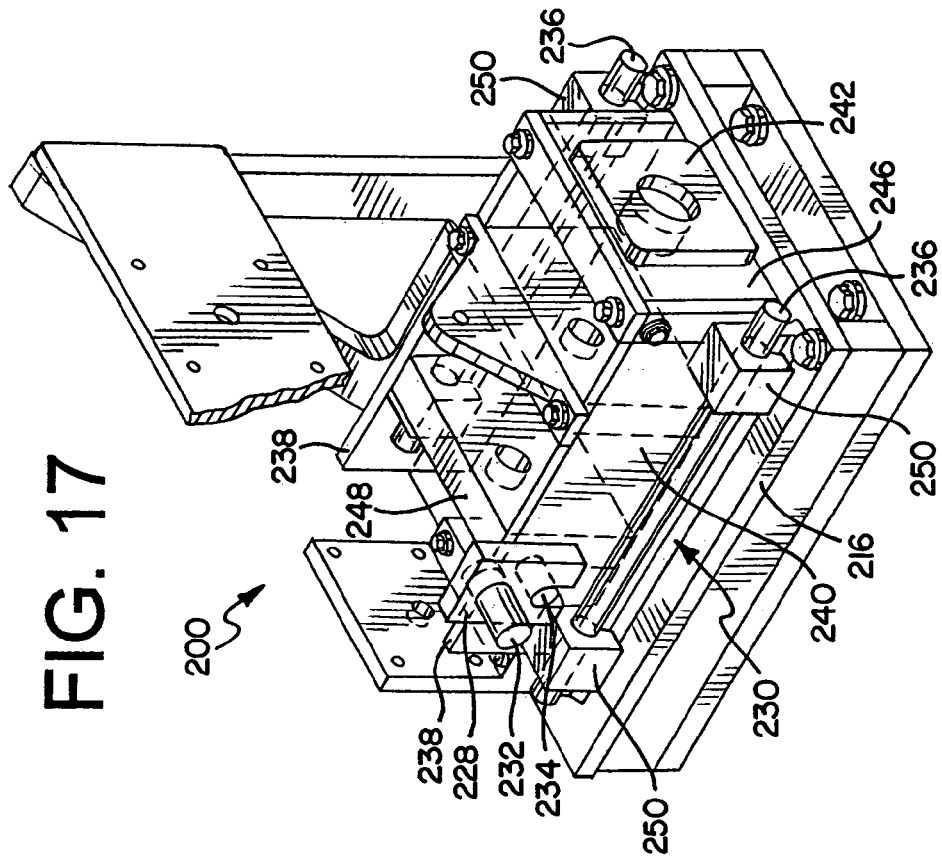
FIG. 17 is a perspective view of the linear motion assembly of the second bottom forming workstation of FIG. 15.

The linear motion assembly 200 of one embodiment of the second bottom forming workstation 34 is shown in FIG. 17, and in a preferred embodiment generally includes a motor (the second bottom forming linear motor 78), a right angle gear box 226, a drive fork 228 and a slide assembly 230. The linear motion assembly 200 is at least partially moveably connected to the mounting assembly 208. The right angle gear box 226 and motor 78 are connected to the first support bracket 218. A drive shaft 232 extending from the gear box 226 extends through an aperture in the first support bracket 218, and the drive fork 228 is connected to the portion of the gear box drive shaft 232 extending through the first support bracket 218. A cam follower 234 extends from the slide assembly 230 and is positioned between fork arms of the drive fork 228 to laterally move the slide assembly 230 in response to rotation of the second bottom forming linear motor 78. In a preferred embodiment the second bottom forming linear motor 78 is a servo motor.

In general the slide assembly 230 slides back and forth (i.e., toward and away from the mandrel 48 on the main turret 12) on a pair of slide rails 236 that are mounted to the main plate 216 in response to the rotation of the second bottom forming linear motor 78. Thus, as the second bottom forming linear motor 78 and drive fork 228 rotate, the cam follower 234, which is connected to one of the side plates 238 of the slide assembly 230, is manipulated by the drive fork 228 and moves the slide assembly 230 back and forth on the slide rails 236.

The slide assembly 230 generally comprises a drive plate 240 at the bottom of the slide assembly 230, two opposing side plates 238 extending upward from the drive plate 240, a front plate 242 onto which the forming collar 244 is connected, a front bearing plate 246 connected between the side plates 238, and a rear bearing plate 248 connected between the side plates 238. The front plate 242 has an aperture therein concentric with the opening 243 of the forming collar 244 to allow the forming tool 210 to reside and move within the opening 243 of the forming collar 244. Bearings 250 extend from the side plates 238 to engage the slide rails 236 and to positively secure the slide assembly 230 in sliding engagement with the slide rails 236. Further, the front and rear bearing plates 246, 248 house bearings to support a portion of the rotating barrel 254 between the front and rear bearing plates 246, 248. As explained in detail below, a rotatable tool shaft 256 is rotatably contained within an offset bore 258 in the barrel 254. The tool shaft 256 and barrel 254 move inward and outward with the slide assembly 230.

Figure 18:
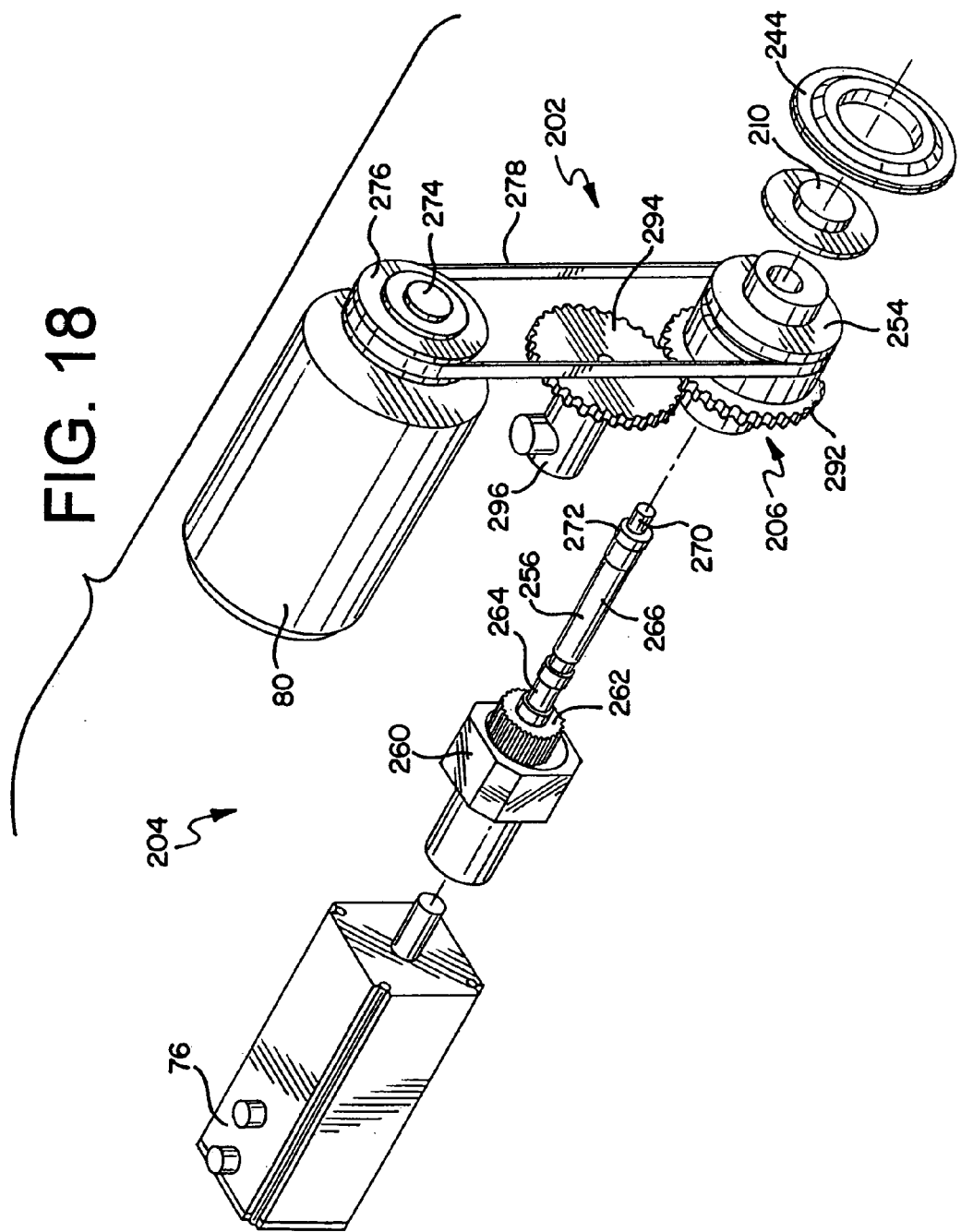
FIG. 18 is a partial exploded view of the second bottom forming workstation of FIG. 15.

The rotatable tool shaft 256 is also a component of the phase change assembly 204. As shown in FIG. 18, in one embodiment the phase change assembly 204 generally comprises the second bottom forming phase adjustment motor 76, an external ring gear 260 driven by the second bottom forming phase adjustment motor 76, and an internal planetary gear 262 connected to the tool shaft. The phase change assembly 204 is operably connected to the tool shaft 256.

Figure 19:
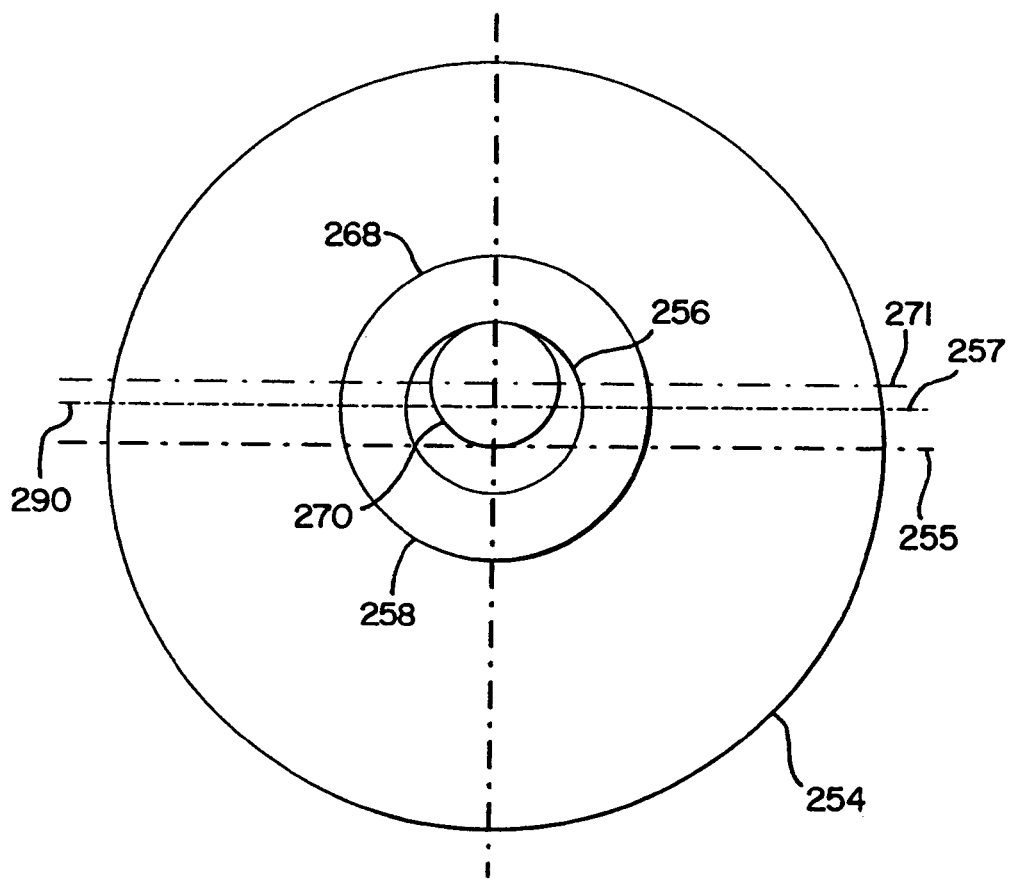
FIG. 19 is an end schematic view of the offsets of the second bottom forming workstation.

As shown in FIGS. 18 and 19, the tool shaft 256 has a first end 264 at which the internal gear 262 is connected thereto. The shaft 256 also has central portion 266 that is housed in bearings 268 in the offset bore 258 in the barrel 254. Finally, the shaft 256 has an eccentric stub shaft portion 270 that extends from a second end 272 of the shaft 256. The bottom seal finishing tool 210 is connected to the eccentric stub shaft 270 at the second end 272 of the shaft 256. In one embodiment of the tool shaft 256, the shaft 256 has a centerline or central longitudinal axis 257. The eccentric stub shaft portion 270, however, has a centerline or central longitudinal axis 271 that is offset from the central longitudinal axis 257 of the shaft. In a preferred embodiment, the central longitudinal axis 271 of the eccentric stub shaft 270 is offset 0.125" from the central longitudinal axis 257 of the shaft 256. Following the description of the constant rotation assembly 202 below, an explanation of the cooperation of the components will be provided to detail how the bottom seal finishing tool 210 is adapted to engage the cup 90 to form the bottom seal 98.

The constant rotation assembly 202 of the second bottom forming workstation 34 is best shown in FIGS. 15 and 18. In a preferred embodiment, the constant rotation assembly 202 includes a constant rotation motor 80 (i.e., the second bottom forming rotary motor 80) which drives the barrel 254. In one example the constant rotation motor 80 is an A.C. motor that continually rotates the barrel 254 at a constant rate of revolution, such as 1,725 revolutions per minute in one embodiment. The constant rotation motor 80 is mounted to the rear face 223 of the first motor mount plate 222, and the drive shaft 274 of the constant rotation motor 80 extends through an aperture in the first motor mount plate 222. A sheave 276 is connected to the drive shaft 274 of the constant rotation motor 80, and a V-belt 278 is provided between the sheave 276 and the barrel 254 to drive the barrel 254. The barrel 254 has a V-groove 280 in the circumference thereof to accept the V-belt 278.

Figure 20:
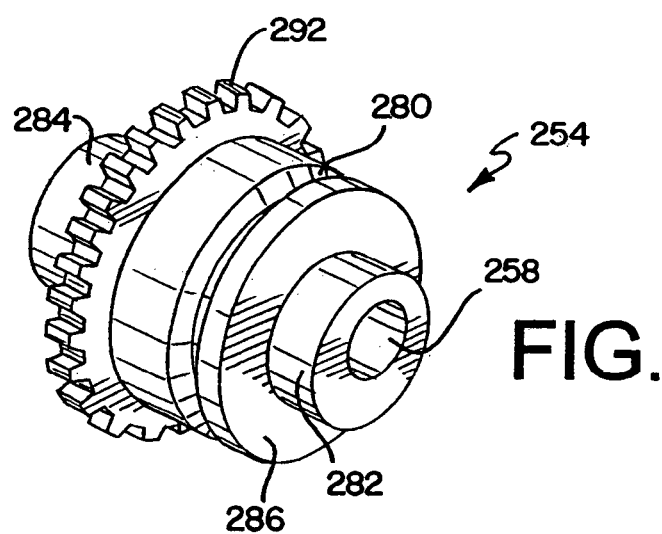
FIG. 20 is a perspective view of the barrel of the second bottom forming workstation.

As explained above, in one embodiment the barrel 254 is associated with each of the linear motion assembly 200, the constant rotation assembly 202 and the phase change assembly 204 (as well as the tracking assembly 206 as described below), however one of ordinary skill in the art would understand that a single component, such as the barrel 254, need not be associated with each of these assemblies, and instead multiple components may be utilized to perform the same functions as the barrel 254. Notwithstanding, in a preferred embodiment, as shown in FIGS. 19 and 20, the barrel 254 comprises a substantially cylindrical component having a first hub 282 extending from one end of the barrel 254, and a concentric second hub 284 extending from the opposing end of the barrel 254. Additionally, while in the preferred embodiment the barrel is cylindrical, it is understood that it could be any shape and is not limited to this configuration. The first hub 282 is positioned within the bearing in the front bearing plate 246, and the second hub 284 is positioned within the bearing in the rear bearing plate 248. As such, the barrel 254 is free to rotate within the slide assembly 230 of the linear motion assembly 200 of the second bottom forming workstation 34, and on the same longitudinal axis as the mandrel 48.

Referring to FIGS. 19 and 20, the barrel 254 has a central axis 255 extending from the first end 286 of the barrel 254 to the second end 288 of the barrel 254. The barrel 254 rotates about its central axis 255 (on the first and second hubs 282, 284). The barrel 254 further has an offset bore 258 extending from the first end 286 to the second end 288 of the barrel 254. The central axis 290 of the offset bore 258 is not concentric with the central axis 255 of the barrel 254, and rather is offset from or eccentric to the central axis 255 of the barrel 254. In one embodiment, the central axis 290 of the offset bore 258 is offset 0.250" radially outward from the central axis 255 of the barrel 254. Accordingly, as the barrel 254 is rotated by the constant rotation motor 80, the shaft 256 in the barrel bore 258 will move in a circle about a 0.250" radius to the center of the central axis 255 of the barrel 254 due to its being seated in the bore 258 offset from the central axis 255 of the barrel 254.

As explained above, the shaft 256 has a central portion 266 that is housed within the bearings 268 in the offset bore 258 of the barrel 254, and an eccentric stub shaft portion 270 that extends outside the first end 286 of the barrel 254. Further, in one embodiment the central longitudinal axis 271 of the eccentric stub shaft 270 (on which the bottom seal finishing tool 210 is connected) is offset 0.125" from the central longitudinal axis 257 of the shaft 256. Accordingly, the offset relationship between the central axis 255 of the barrel 254 (i.e., the center of rotation of the barrel 254) and the central axis 271 of the bottom seal finishing tool 210 can be modified between 0.125" and 0.375". Thus, by changing the phase relationship between the barrel 254 and the tool shaft 256, the finishing tool 210 can revolve about the center of the barrel 254 on a radius that can be modified between 0.125" and 0.375" in addition to the radius of the offset bore to the center of the barrel. Put another way, by changing the phase relationship between the barrel 254 and the tool shaft 256 (or more importantly the eccentric stub shaft 270 portion of the tool shaft 256), the finishing tool 210 can be made to apply pressure to iron the skirt 100 to the distal end portion 112 and bent lip portion 102 of the sidewall blank 92 to create the bottom seal 98 for the cup. Further, by varying the phase relationship between the barrel 254 and the tool shaft 256, the amount of pressure applied by the finishing tool 210 on the cup 90 can be made to change or be varied. Accordingly, different types of seals and different pressures can be applied by merely modifying the phase relationship to increase or decrease the amount of offset through the rotation of the tool shaft 256. Further, tool wear can accommodated for electronically instead of having to re-machine or replace various components.

The phase relationship between the barrel 254 and the tool shaft 256, or more pertinently the phase relationship between the barrel 254 and the finishing tool 210 is controlled by the relationship of the velocity of the constant rotation motor 80 that rotates the barrel 254, and the velocity of the second bottom forming phase adjustment motor 76 that rotates the external ring gear 260. If the velocities match the phase remains the same and the relative position of the two remains the same. If the velocities do not match, the phase will continue to change at a rate equal to the difference in velocity. As the constant rotation motor 80 rotates the barrel 254, the shaft 256 moves in a circle due to the shaft 256 being seated in the offset bore 258 of the barrel 254. Further, as the shaft 256 moves in the circle the internal planetary gear 262 at the first end 264 of the shaft 256 engages the external ring gear 260 driven by the second bottom forming phase adjustment motor 76. Referring to FIG. 21, the velocity of the constant rotation motor 80 is constant at approximately 1,725 revolutions per minute. Thus, the velocity of the barrel 254 is also approximately constant, and is monitored by the tracking assembly 206 described below. The tracking assembly 206 tracks the velocity of the barrel 254 and provides position and velocity reference back to the drive for the second bottom forming phase adjustment motor 76. This information allows the second bottom forming phase adjustment motor 76, which controls the rotation of the tool shaft 256, to move in synchronization with the barrel 254 (i.e., at the same velocity).

When the forming tool 210 needs to move out to engage the cup for ironing of the bottom seal 98, the second bottom forming phase adjustment motor 76 advances the phase relationship between the tool shaft 256 and the barrel 254 by increasing the velocity of the external ring gear 260 which spins the internal planetary gear 262 to spin the shaft 256. By spinning the shaft 256, the eccentric stub shaft 270 portion of the tool shaft 256 is rotated. Thus, the tool 210 is rotated outward by adjusting the relationship of the radius of rotation of the tool 210 to the barrel 254 through spinning the tool shaft 256 having the eccentric stub shaft 270 portion.

In a preferred embodiment the second bottom forming phase adjustment motor 76 is a servo motor. Further, in a most preferred embodiment the servo motor of the second bottom forming phase adjustment motor 76 has a drive that is electrically connected to the drive (i.e., a programmable limit switch output) of the virtual motor 52.

Once the forming tool 210 engages the cup 90 with an appropriate pressure the second bottom forming phase adjustment motor 76 ramps back down to a one to one velocity ratio with the barrel to maintain the same phase relationship between the forming tool 210 and the barrel

254. At this time the tool 210 rotates in a radius such that the tool 210, which has been moved radially outward to engage the cup 90, rotates around the entire inner circumference of the cup to rotatedly iron the skirt 100 to the distal end portion 112 and bent lip portion 102 of the sidewall blank 92 to create the bottom seal 98 for the cup.

After the tool 210 has moved at least 360° around the inner circumference of the cup and the bottom seal 98 is completely ironed, the second bottom forming phase adjustment motor 76 retards the phase relationship between the tool shaft 256 and the barrel 254 (i.e., it decreases the velocity of the external ring gear for a period of time and then returns to the same velocity to spin the tool shaft 256 to move its eccentric stub portion 270 back to its original radial position), thereby returning the forming tool 210 back to its original smaller-radius circle of rotation which is disengaged from the cup 90 so that the forming tool 210 can be removed from the recessed area 116 of the cup 90 (see FIG. 21). Once the phase change has been completed, the second bottom forming phase adjustment motor 76 returns to a one to one velocity ratio with the barrel 254 and the second bottom forming linear motor 78 retracts the slide assembly 230 to remove the tool 210 from the cup 90 and to allow the main turret 12 to advance the mandrel 48 to the next workstation.

As explained above, the tracking assembly 206, which is best shown in FIGS. 15 and 18, assists in providing a signal of the velocity and position of the barrel 254. The components for providing the signal for the tracking assembly 206 comprise a first gear 292 connected to the outside of the barrel 254, a mating second gear 294 geared at a one to one ratio with the first gear 292, and an encoder 296 driven by the mating second gear 294. Since the encoder 296 is geared at a one to one ratio with the barrel 254, the encoder 296 can track the speed of the barrel 254 to provide position and velocity reference data of the barrel 254 to the drive of the second bottom forming phase adjustment motor 76. This information is provided to the second bottom forming phase adjustment motor 76 to control the rotation of the shaft 256 and to keep the phase relation of the shaft 256 synchronized with the barrel 254 according to the drive profile.

In summary, the second bottom forming workstation 34 operates through a series of interconnected assemblies. At some point immediately prior to or during the advancement of a mandrel 48 by the main turret 12 from the first bottom forming workstation 30 to the second bottom forming workstation 34, a signal is sent from the drive of the main turret motor 50 (via the virtual motor drive 52) to the second bottom forming workstation 34 to initiate linear movement. The actions that the motors of the second bottom forming workstation 34 are to initiate are based on drive or motion profiles stored in the main controller 49 and transferred to the respective drives of the second bottom forming linear motor 78 and second bottom forming phase adjustment motor 76. Additionally, it is understood that the main controller 49 controls power to the second bottom forming rotary motor 80 (the constant rotation motor for the second bottom forming workstation 34) to maintain that motor rotating the barrel 254 at a constant rate of revolution.

Typically, in one embodiment the first action by the second bottom forming workstation 34 is to have the drive profile for the second bottom forming linear motor 78 initiated. As such, the second bottom forming linear motor 78 is energized and rotates the drive fork 228, which in turn engages the cam follower 234 to slide the slide assembly 230 toward the mandrel 48 having the partially formed cup thereon. As the slide assembly 230 moves toward the mandrel 48, a portion of the slide assembly 230 is positioned around the distal portion of the sidewall 112, the skirt 100 and the bent lip portion of the sidewall 102 of the partially formed cup. More specifically, the forming collar 244 is positioned about the periphery of the identified lower portion of the partially formed cup 46 such that the cup is positioned within the opening 243 in the forming collar 244. Further, as the slide assembly 230 is moved into its appropriate position the forming tool 210, which is rotating in a circle in a portion of the opening 243 in the forming collar 244 based on the rotation of the barrel 254 from the constant rotation assembly 202, will be located within the recessed area 116 of the cup 90 and still rotating in the same circle. Thus, the distal end portion 112 of the sidewall blank 92 and the skirt 100 of the cup will be located between the inner circumference of the forming collar 244 and the forming tool 210.

As soon as the second bottom forming linear motor 78 positions the forming collar 244 and forming tool 210 in the appropriate position through its movement of the slide assembly 230, or immediately prior thereto based on flag settings, a command signal is sent from the programmable limit switch of the drive of the second bottom forming linear motor 78 to the second bottom forming phase adjustment motor 76 to initiate its drive profile to change the phase relationship between the shaft 156 and the forming tool 210 connected thereto and the barrel 254. It is understood that the second bottom forming phase adjustment motor 76 is generally constantly running to rotate the ring gear 260 to match the velocity of the barrel 254 and to keep the phase relationship between the shaft 256 and the barrel 254 substantially identical. When the phase relationship between the shaft 256 and the barrel 254 are substantially identical the tool 210 will generally rotate in a constant radius circle, such radius being determined by the offset of the offset bore 258 of the barrel 254 and the location of the offset stub shaft portion 270 of the shaft 256 relative to the offset bore 258. As soon as the second bottom forming linear motor 78 positions the forming collar 244 around the cup 90 and forming tool 210 within the recessed area 116 of the cup 90, the second bottom forming phase adjustment motor 76 will change the phase relationship between the barrel 254 and the tool shaft 256 to spin the offset stub shaft 270 and connected forming tool 210 outward toward the cup. After the forming tool 210 engages the cup with the appropriate pressure against the forming collar 244, the bottom forming phase adjustment motor 76 will again match the phase relationship between the barrel 254 and the tool shaft 256 to allow the tool shaft 256 to tractor-wheel or spin around the entire inner circumference against the bent lip portion 102 of the cup to form the three-layered bottom seal 98. Additionally, after the bottom seal 98 is formed the second bottom forming phase adjustment motor 76 retards the phase relationship between the tool shaft 256 and the barrel 254 to return the forming tool 210 back to its original smaller-radius circle of rotation, and then returns back to a one to one velocity ratio with the barrel 254 to maintain the tool 210 in that circle. Finally, the second bottom forming linear motor 78 retracts the slide assembly 230 to remove the tool 210 and forming collar 244 from the cup 90 and to allow the main turret 12 to advance the mandrel 48 to the next workstation.

As explained above with respect to one embodiment of the bottom forming station 34, as the slide assembly 230 moves inward and outward the barrel 254 moves with the slide assembly 230. The constant rotation motor 80 that drives the barrel 254, however, remains constant. Thus, it is understood that in this embodiment the drive belt 278 for the barrel 254 pivots at a slight angle with the barrel 254 to allow for the linear or lateral movement of the barrel 254.

Figure 30:
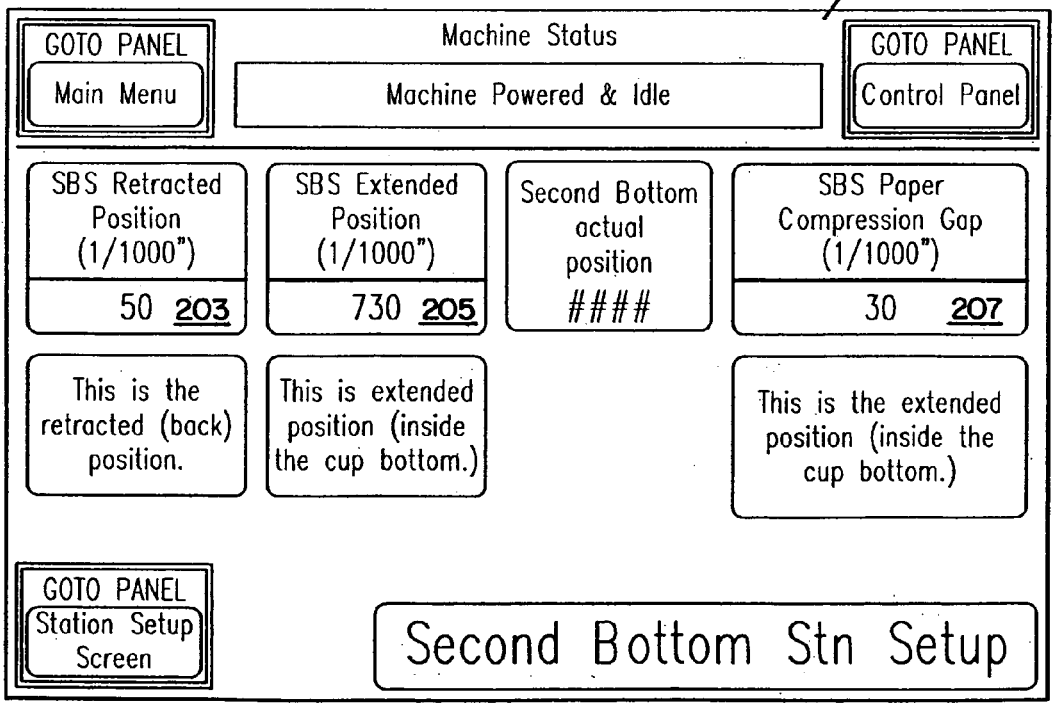
FIG. 30 is an example of a second bottom forming setup screen.

An example of a second bottom forming setup screen 201 is shown in FIG. 30. As shown, the machine operator may adjust the retracted position 203 and the extended position 205 of the slide assembly 230. Additionally, the operator may adjust the paper compression gap 207 (i.e., the distance between the perimeter of the forming tool 210 and the inner circumference of the forming collar 244). Further, the drive profiles for the motors of the second bottom forming workstation 34 that are stored in the main controller 49 may also be electronically modified.

Next, as shown in FIG. 1, the main or mandrel turret 12 advances the mandrel 48 and partially formed cup from the second bottom forming workstation 34 into alignment with and for transfer to a cup receiver 300 on the rimming or horizontal pocket turret 16. Like the main turret 12, the rimming turret 16 is positioned about a vertical axis. The rimming turret 16 is driven by a horizontal turret motor 56. In a preferred embodiment the horizontal turret motor 56 is a servo motor.

The horizontal turret motor 56 receives its drive signals from at least one of the main controller 49 and a drive or controller for the virtual motor 52 (operating on an electronic one to one ratio with the main turret drive motor 50). In response to the at least one signal the horizontal turret motor 56 rotates the rimming turret 16 about the variety of workstations positioned about the rimming turret 16. More specifically, in one embodiment a drive or motion profile for the horizontal turret motor 56 resides in the main controller 49. The drive profile is transmitted to the drive of the horizontal turret motor 56 from the main controller 49. Further, in a preferred embodiment the drive of the horizontal turret motor 56 is hard wired to the programmable limit switch output of the drive of the virtual motor 52. As the main motor 50 cycles its drive and the drive of the virtual motor 52 send out signals to the various components at different positions of the main motor's cycle. At a specific position in its cycle the drive of the virtual motor 52 sends out a command signal to the drive of the horizontal turret motor 56 to have the horizontal turret motor 56 initiate its programmed drive or motion profile (i.e., to index to the next workstation).

Figure 31:
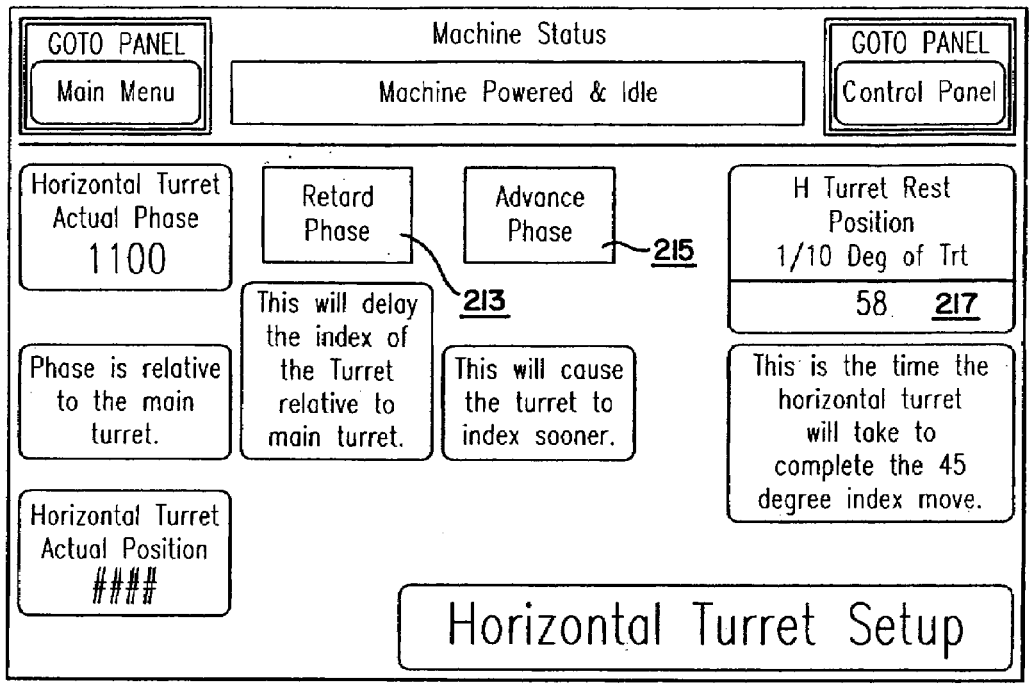
FIG. 31 is an example of a horizontal rimming turret setup screen.

An example of a horizontal turret setup screen 211 is shown in FIG. 31. As shown, the machine operator may retard 213 and advance 215 the phase of the horizontal turret motor 56 relative to the main turret motor 50. Retarding the phase will delay the indexing of the horizontal turret 16 relative to the main turret 12. Conversely, advancing the phase will cause the horizontal turret 16 to index sooner relative to the main turret 12. Additionally, the operator may adjust the time it takes the horizontal turret 16 to complete one 45° index move 217. Further, the drive profile for the horizontal turret motor 56 that is stored in the main controller 49 may also be electronically modified.

While the main turret 12 has eight equally spaced male mandrels 48, the rimming turret 16 has eight equally spaced female cup receivers 300 (i.e., spaced approximately every 45° about the rimming turret 16). Each of the female cup receivers 300 on the rimming turret 16 extend radially outward from the rimming turret 16. In general, the rimming turret 16 is rotated or advanced in unison with the main turret 12 so that during each dwell period (the time period when the main turret 12 is stopped and the various workstations are performing tasks on the cup) one male mandrel 48 is aligned with an associated cup receiver 300 as shown in FIG. 1.

When a male mandrel 48 becomes aligned with an associated cup receiver of the rimming mandrel 16, the associated seal clamp 158 from the mandrel turret 12 is raised by a cam track and releases the partially formed cup on the mandrel 48. Thereafter, compressed air is introduced through the mandrel 48 to the inside of the cup so that the cup is blown in a generally straight line to the awaiting cup receiver 300. After receiving the partially completed cup a vacuum may be applied in the cup receiver 300 to retain the cup. Additionally, after the cup has been delivered from the main turret 12 to the rimming turret 16, the main turret 12 advances one index to the bottom punch workstation 24 wherein the process described above begins again.

Similarly, the rimming turret 16 then advances two indexes to the tamper and lube workstation 36. The tamper and lube workstation 36 is shown in FIG. 22, and generally comprises a mounting fixture 302, a tamper and lube motor 82, a tamper and lube tool 304, a drive fork 306 and a cam follower assembly 308. In a preferred embodiment the tamper and lube motor 82 is a servo motor. The drive fork 306, which is driven by the drive shaft of the tamper and lube motor 82, and the cam assembly 308 connected to the tamper and lube tool 304, operate to convert the rotational motion of the tamper and lube motor 82 to linear motion of the tamper and lube tool 304. In general, during the dwell time when the rimming turret 16 comes to a stop at the tamper and lube workstation 36, the tamper and lube tool 304 moves forward toward the cup receiver 300 to push the partially formed cup into a properly seated relationship with the receiver 300 and to lubricate the upper region 108 of the sidewall blank 92 for subsequent forming of the overturned rim 106 of the cup 90.

Figure 32:
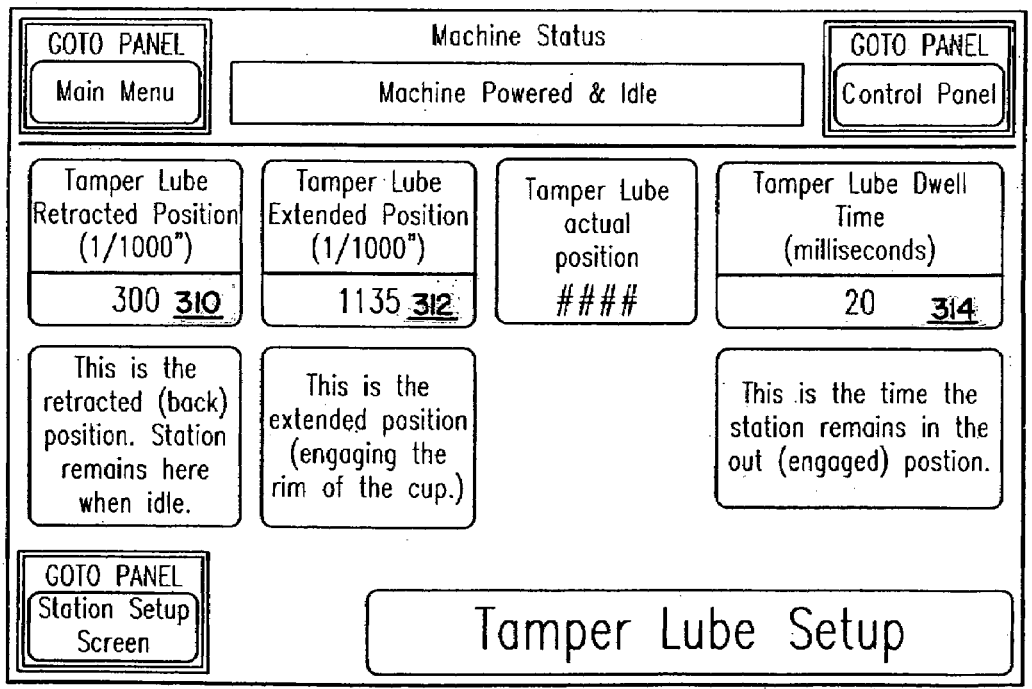
FIG. 32 is an example of a tamper and lube setup screen.

In operation, the drive of the tamper and lube motor 82 receives a drive profile signal from the main controller 49, and a command signal from the drive of the horizontal turret motor 56. In one embodiment, the drive of the tamper and lube motor 82 is wired directly to the programmable limit switch output of the drive of the horizontal turret motor 56 to receive a control/command signal therefrom. In response to the command signal the tamper and lube motor 82 moves the tamper and lube tool 304 forward toward the cup receiver 300 to engage the cup according to a specific drive profile sent to the drive of the tamper and lube motor 82 by the main controller 49. Because the tamper and lube workstation 36 has its own drive motor 82, and because the drive profile and parameters therefore can be independently modified, the operation and efficiency of this workstation is greatly enhanced. For example, as shown in the tamper and lube setup screen 309 in FIG. 32, the machine operator may adjust: the tamper lube retracted position 310; the tamper lube extended position 312; and the tamper lube dwell time 314. Additionally, the tamper and lube drive profile stored in the main controller 49 may also be electronically modified.

Referring to FIG. 1, the rimming turret 16 then advances the partially formed cup seated in the cup receiver 300 to the pre-curl workstation 38. As shown in FIG. 23, in one embodiment the pre-curl workstation 38 generally comprises a mounting fixture 320, a pre-curl motor 84, a rim rolling tool 322, a drive fork 324 and a cam follower assembly 326. In a preferred embodiment the pre-curl motor 84 is a servo motor. The drive fork 324, which is driven by the drive shaft of the pre-curl motor 84, and the cam follower assembly 326 connected to the rim rolling tool 322, operate to convert the rotational motion of the pre-curl motor 84 to linear motion of the rim rolling tool 322. In general, during the dwell time when the rimming turret 16 comes to a stop at the pre-curl workstation 38, the pre-curl tool 322 moves forward into engagement with the cup and operates to begin to roll the rim 106 at the upper region 108 of the sidewall 92. This tool is heated to approximately 200° to facilitate forming the rim on the cup.

Next, the rimming turret 16 advances the cup receiver 300 to the finish curl workstation 40. The finish curl workstation 40 has similar components and operates similar to the pre-curl workstation 38, except that the extended position of the finish curl tool is further than the extended position of the pre-curl tool 322 to complete the rim rolling process and complete the manufacturing of the cup 90. Like the tool of the pre-curl workstation 38, the tool of the finish curl workstation 40 is heated to approximately 200° to facilitate forming the rim on the cup.

Figure 33:
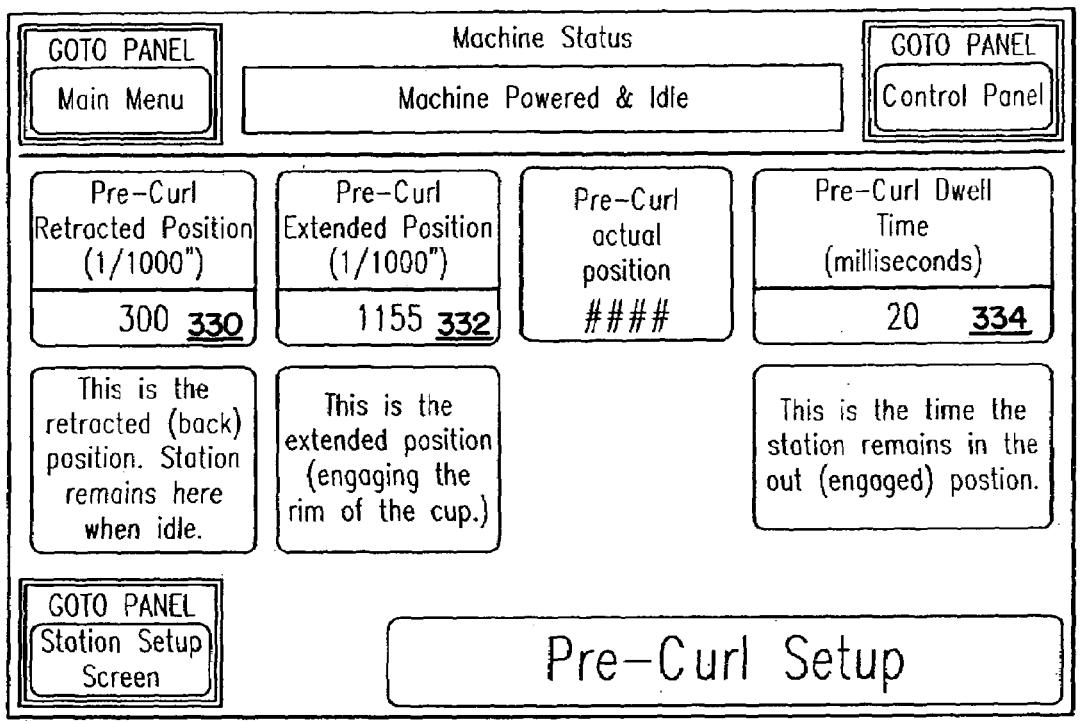
FIG. 33 is an example of a pre-curl setup screen; and,
FIG. 34 is an example of a finish curl setup screen.
Figure 34:
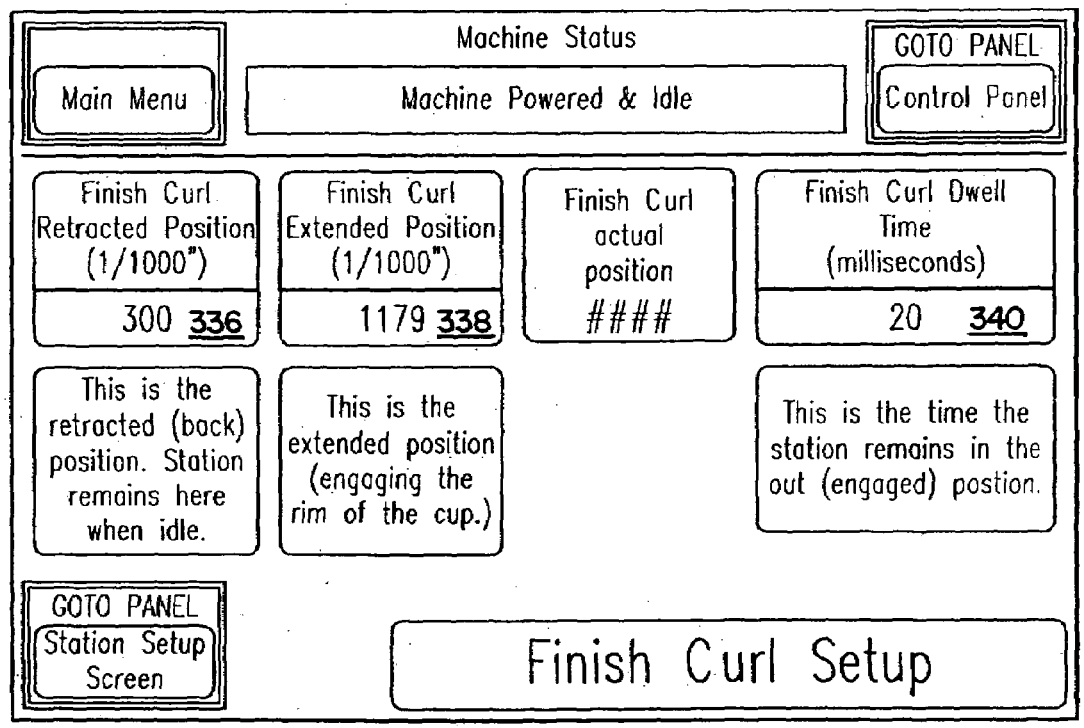

In operation, the drives of both the pre-curl motor 84 and the finish curl motor 86 receive a drive profile signal from the main controller 49, and a command signal from the drive of the horizontal turret motor 56. In one embodiment, the drive of each of the pre-curl motor 84 and the finish curl motor 86 is hardwired directly to the drive of the horizontal turret motor 56. In response to the command signal sent from the drive of the horizontal turret motor 56, the pre-curl motor 84 and the finish curl motor 86, respectively, move their tools forward and engage the cup according to a specific drive or motion profile sent by the main controller 49. Because each of these workstations has their own drive motor, and because the drive profile and parameters therefore can be independently modified, the operation and efficiency of these workstations are greatly enhanced. Further, their usefulness with a variety of paper and cup types is greatly enhanced. For example, the amount of rolled rim 106 desired, which affects the individual cup 90 height, can be manipulated by these workstations. As shown in the respective setup screens, see FIGS. 33 and 34, the machine operator may adjust: the pre-curl retracted position 330; the pre-curl extended position 332; the pre-curl dwell time 334; the finish curl retracted position 336; the finish curl extended position 338; and, the finish curl dwell time 340. Additionally, the pre-curl and finish curl profiles stored in the main controller 49 may also be electronically modified.

The finish curl operation is the last operation performed on the cup 90. After the cup 90 is completely formed, the rimming turret 16 again advances one workstation index and to a discharge workstation 42. At that workstation 42 the finished cup 90 is blown from the cup receiver 300 by a jet of compressed air into a discharge tube, see FIG. 1, which serves to guide the finished cup to a collecting device (not shown). If the finished cup 90 is defective for some reason, however, the cup receiver 300 will not discharge the cup 90 into the discharge tube, but rather will wait until the rimming turret 16 advances to the next workstation, the reject discharge workstation 44, to discharge the cup 90.

While various drive and signal configurations for a preferred embodiment of the cup forming machine 10, and for preferred embodiments of various workstations, have been illustrated and described herein, one of ordinary skill in the art would readily understand that a multitude of drive and signal configurations are possible without departing from the scope of the present invention.

Additional features of the cup forming machine 10 are also present. For example, one embodiment of the cup forming machine 10 embodies a stop feature wherein when a stop is initiated by the operator, the machine 10 tracks the last cup 90 through the machine and then stops each of the turrets and workstations. Another feature of this machine 10 is that during an emergency stop all of the servo motors are disabled. Accordingly, all subassemblies can be manually manipulated so that maintenance of any servo motor can be completed on any motor. When an emergency stop is removed all of the servo motors open completely and then cycle to the start position.

The above-described cup forming machine 10 is one example of many that may, or may not, incorporate a variety of workstations and turrets as described. Different arrangements of workstations may be used on other cup forming machines. For example, some cup forming machines utilize a single turret with additional rimming stations disposed about the single turret. All are equally adaptable to incorporate any of the workstations, including the workstations to fold the sidewall and the workstation to perform the bottom finish technique of the present invention.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A computer controlled cup forming machine comprising:
   a main turret assembly rotatably mounted on a shaft and a plurality of workstations spaced about the periphery of the main turret assembly; and,
   a main motor driving the main turret assembly, the main motor electrically connected to at least one of the plurality of workstations spaced about the periphery of the main turret assembly, the main motor developing electrical signals of the position of the main motor and sending the electrical signals to the workstations electronically connected thereto to initiate action of the workstations.

2. The computer controlled cup forming machine of claim 1, wherein the main motor is electronically connected to another motor of at least one of the plurality of workstations, and wherein the main motor sends electrical signals to initiate action of at least one of the workstations.

3. The computer controlled cup forming machine of claim 1, further comprising a plurality of drive motors for the plurality of the workstations spaced about the periphery of the main turret assembly.

4. The computer controlled cup forming machine of claim 3, wherein the main motor is electrically connected to at least one of the plurality of drive motors.

5. The computer controlled cup forming machine of claim 1, further comprising separate drive motors for the plurality of the workstations spaced about the periphery of the main turret assembly.

6. The computer controlled cup forming machine of claim 1, further comprising separate drive motors for each of the plurality of workstations spaced about the periphery of the main turret assembly, the main motor being electrically connected to at least one of the drive motors for the plurality of workstations.

7. A computer controlled cup forming machine comprising:
a main turret assembly and a plurality of workstations spaced about the periphery of the main turret assembly;
individual motors for the plurality of the workstations; and,
a main controller storing drive profiles for the individual motors, the main controller being electrically connected to the individual motors to send signals of the drive profiles to the individual motors.

8. The computer controlled cup forming machine of claim 7, further comprising an input station electrically connected to the main controller, wherein a dwell period in the drive profiles can be adjusted at the input station and set independent of a machine speed of the cup forming machine.

9. The computer controlled cup forming machine of claim 7, further comprising a main motor, the main motor electrically connected to at least one of the individual motors for the workstations, the main motor developing electrical signals of the position of the main motor and sending the electrical signals to the at least one of the individual motors electronically connected thereto to initiate action of the workstation.

10. The computer controlled cup forming machine of claim 7, wherein the individual motors can be independently operated.

11. The computer controlled cup forming machine of claim 7, wherein the workstations can be independently operated.

12. A computer controlled cup forming machine comprising:
a main turret assembly and a plurality of workstations spaced about the periphery of the main turret assembly;
a plurality of the workstations having individual motors; and,
a main controller electrically connected to a plurality of the individual motors, the main controller having an input station to quantitatively adjust control parameters for the motors, and the main controller sending signals to the motors of the adjusted control parameters to assist in quantitatively controlling motion of the motors.

13. A computer controlled cup forming machine comprising:
a main turret assembly and a plurality of workstations spaced about the periphery of the main turret assembly:
a main turret assembly having a main motor;
a plurality of workstations adjacent the main turret assembly, the plurality of workstations having individual motors therefor; and,
a main controller electrically connected to the main motor and the individual motors to send control signals to a plurality of the motors to independently operate the motors.

14. The computer controlled cup forming machine of claim 13, wherein the main controller has a memory for storing drive profiles for the individual motors.

15. The computer controlled cup forming machine of claim 13, further comprising an input station electrically connected to the main controller, wherein a dwell period for drive profiles for at least one of the individual motors can be adjusted at the input station and set independent of a machine speed of the cup forming machine.

16. The computer controlled cup forming machine of claim 13, wherein the main motor is electrically connected to at least one of the individual motors for the workstations, the main motor developing electrical signals of the position of the main motor and sending the electrical signals to the at least one of the individual motors electronically connected thereto to initiate action of the workstation.

17. A cup forming machine supported on a frame, the machine comprising:
a main turret rotatably mounted in association with the frame and a plurality of workstations spaced about the periphery of the main turret;
a master motor having an encoder and a programmable limit switch, the master motor being mechanically coupled to the main turret to drive the main turret, the encoder further developing an electronic signal of the position of the master motor;
a plurality of workstations radially spaced about the main turret, wherein a plurality of the plurality of workstations have a motor coupled thereto;
a controller electrically connected to the master motor and to a plurality of the motors coupled to the workstations, the controller sending output signals to the plurality of motors coupled to the workstations.

18. The cup forming machine of claim 17, wherein a plurality of the motors for the plurality of workstations are electronically coupled to the master motor.

19. The cup forming machine of claim 18, wherein the programmable limit switch has outputs, wherein the programmable limit switch outputs are electronically connected to a plurality of motors of the workstations, and wherein an electronic signal is sent from the programmable limit switch output to motors of the workstations electrically connected thereto.

20. The cup forming machine of claim 17, wherein the controller has a memory and stores drive profiles for a plurality of the motors coupled to the plurality of workstations.

21. The cup forming machine of claim 17, further comprising a virtual motor electrically coupled to the master motor to mirror an output signal of the master motor.

22. The cup forming machine of claim 21, wherein the virtual motor is coupled at an electronic one to one ratio with the main motor.

23. The cup forming machine of claim 22, wherein the virtual motor is electrically connected to another plurality of the motors for the plurality of workstations.

24. The cup forming machine of claim 23, wherein the virtual motor has a plurality of programmable limit switch outputs, and wherein an electronic signal is sent from the programmable limit switch output of the virtual motor to the motors electrically connected thereto.

25. The cup forming machine of claim 17, wherein an output of the programmable limit switch is electrically connected to an input of at least one of the motors receiving signals from the master motor.

26. The cup forming machine of claim 19, wherein the electrical connection between the programmable limit switch outputs of the master motor and the motors of the workstations comprises an electrical wire.

27. A method for forming a cup on a computer controlled cup forming machine, comprising the steps of:
provided a machine having a main turret assembly rotatably mounted on a shaft and a plurality of workstations spaced about the periphery of the main turret assembly;
generating an electronic signal of the position of the main motor;
sending the electronic signal to motors at the plurality of workstations spaced about the main turret assembly to initiate action of the other motors.

28. The method of claim 27, further comprising the step of: storing drive profiles in a controller;
generating an electronic signal of the drive profiles for the motors at the plurality of workstations;
sending the electronic signal to the motors.

29. The method of claim 28, further comprising the step of:
adjusting control parameters at an input module and sending an electronic signal of the adjusted control parameters to the motors of the plurality of workstations.

30. A method for forming a cup on a computer controlled cup forming machine, comprising the steps of:
providing a machine having a main turret assembly rotatably mounted on a shaft and a plurality of workstations spaced about the periphery of the main turret assembly;
storing drive profiles for a plurality of motors for the cup forming machine in a controller;
generating electronic signals of the drive profiles for the plurality of motors;
sending the electronic signals to the motors.

31. The method of claim 30, further comprising the step of:
electronically adjusting at least one drive profile and sending an electronic signal of the adjusted drive profile to at least one of the plurality of motors.

* * * * *